Figure 1:
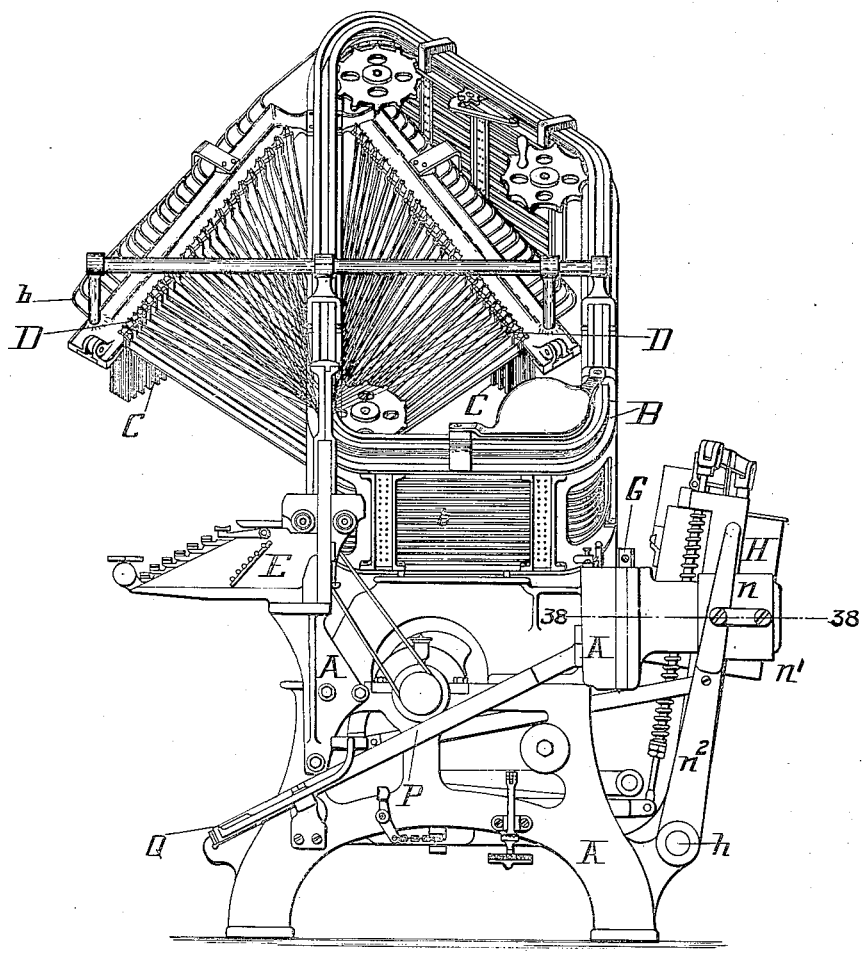

J. R. ROGERS.
LINE CASTING MACHINE.
APPLICATION FILED MAR. 3, 1909.

955,695.

Patented Apr. 19, 1910.
21 SHEETS—SHEET 1.

WITNESSES

INVENTOR

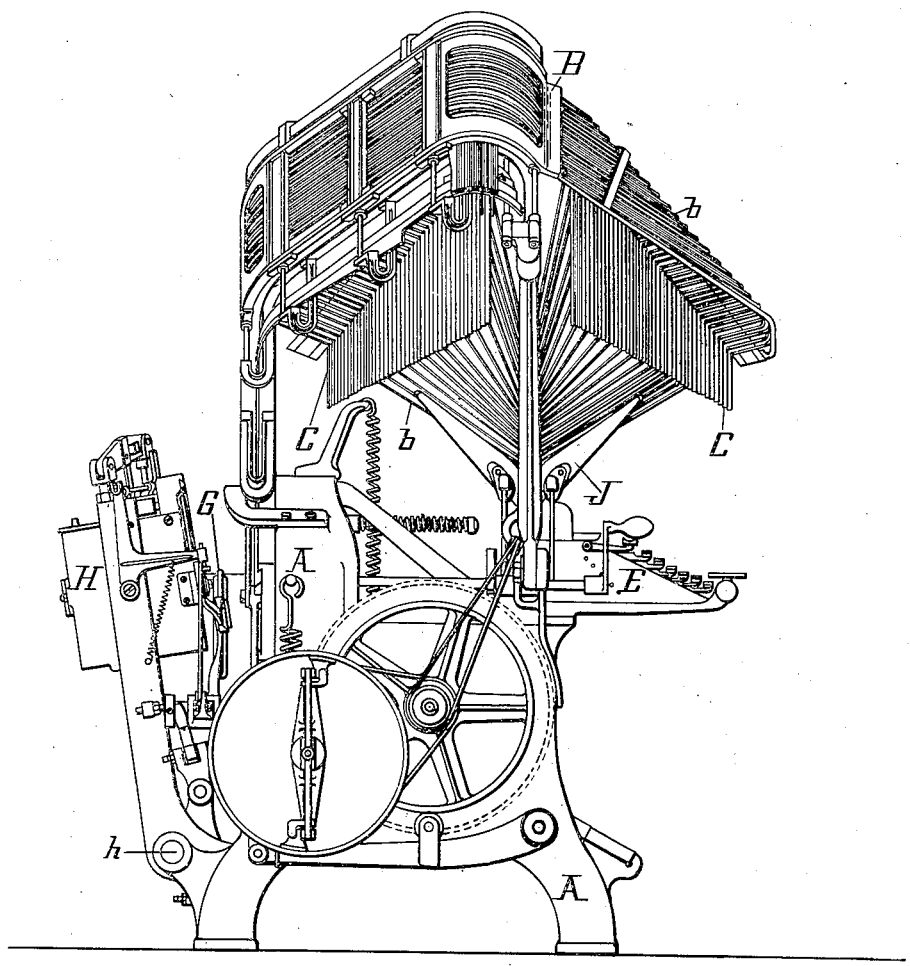

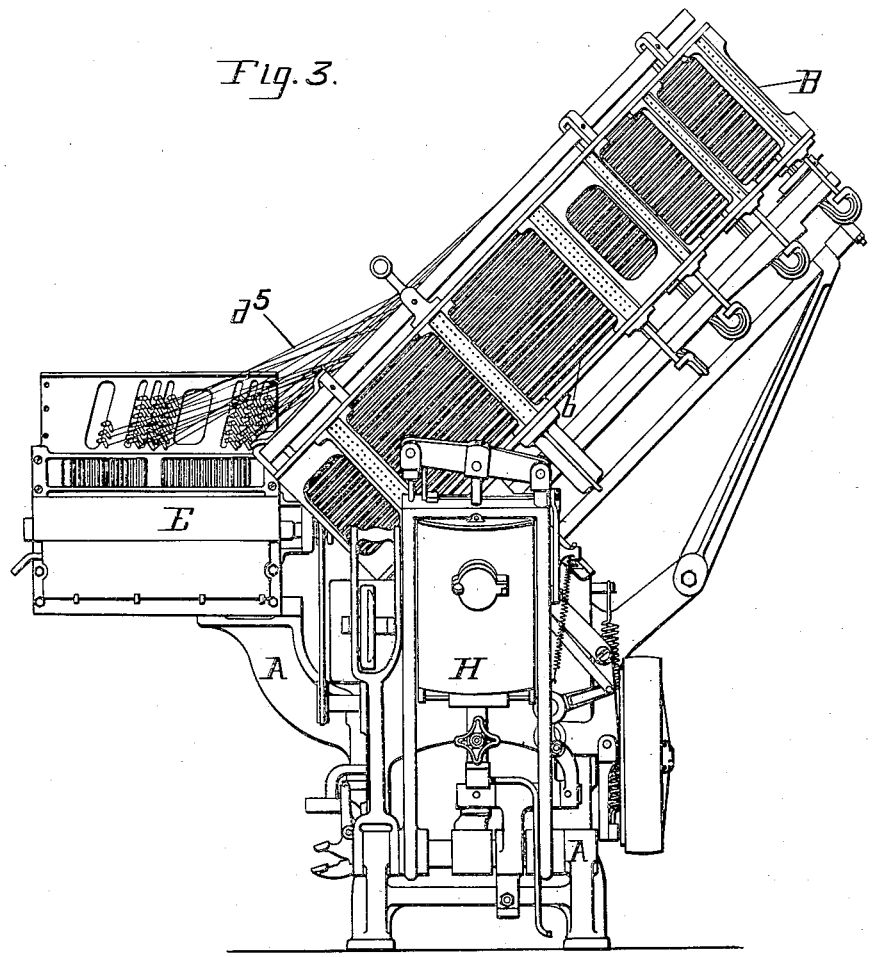

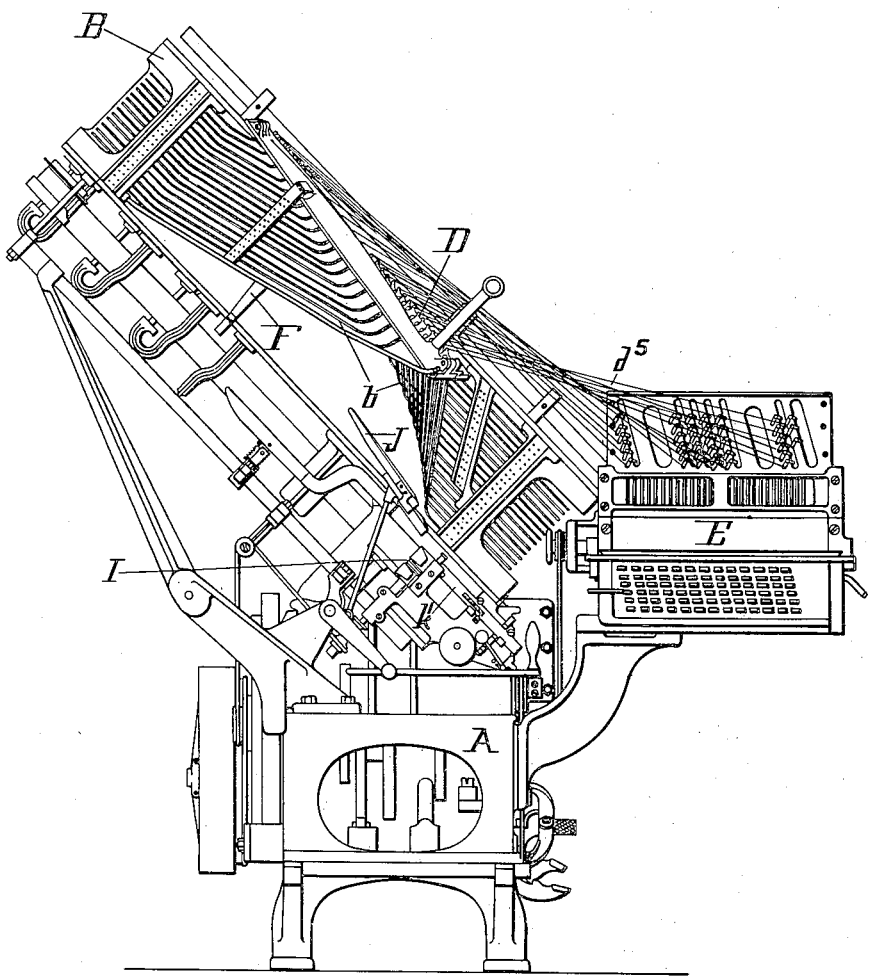

J. R. ROGERS.
LINE CASTING MACHINE.
APPLICATION FILED MAR. 3, 1909.
955,695.
Patented Apr. 19, 1910.
21 SHEETS—SHEET 5.
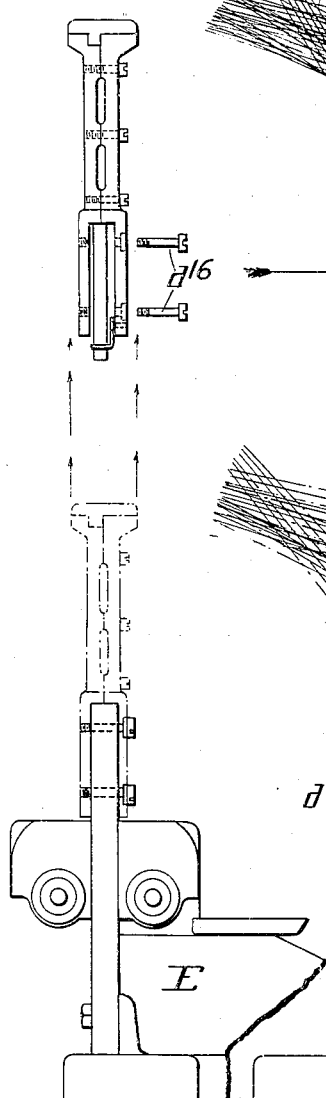
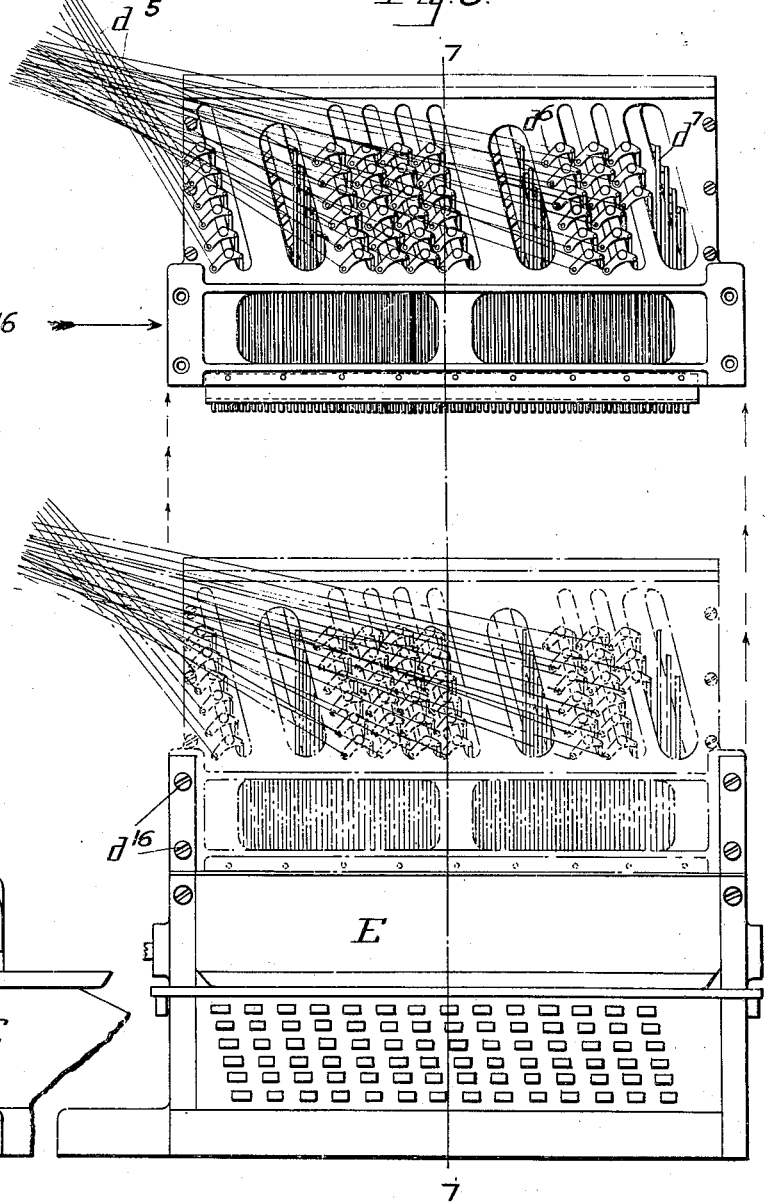
WITNESSES
G. B. Hartley
A. Kunz.
INVENTOR
J. R. Rogers
BY P. T. Dodge
ATTORNEY

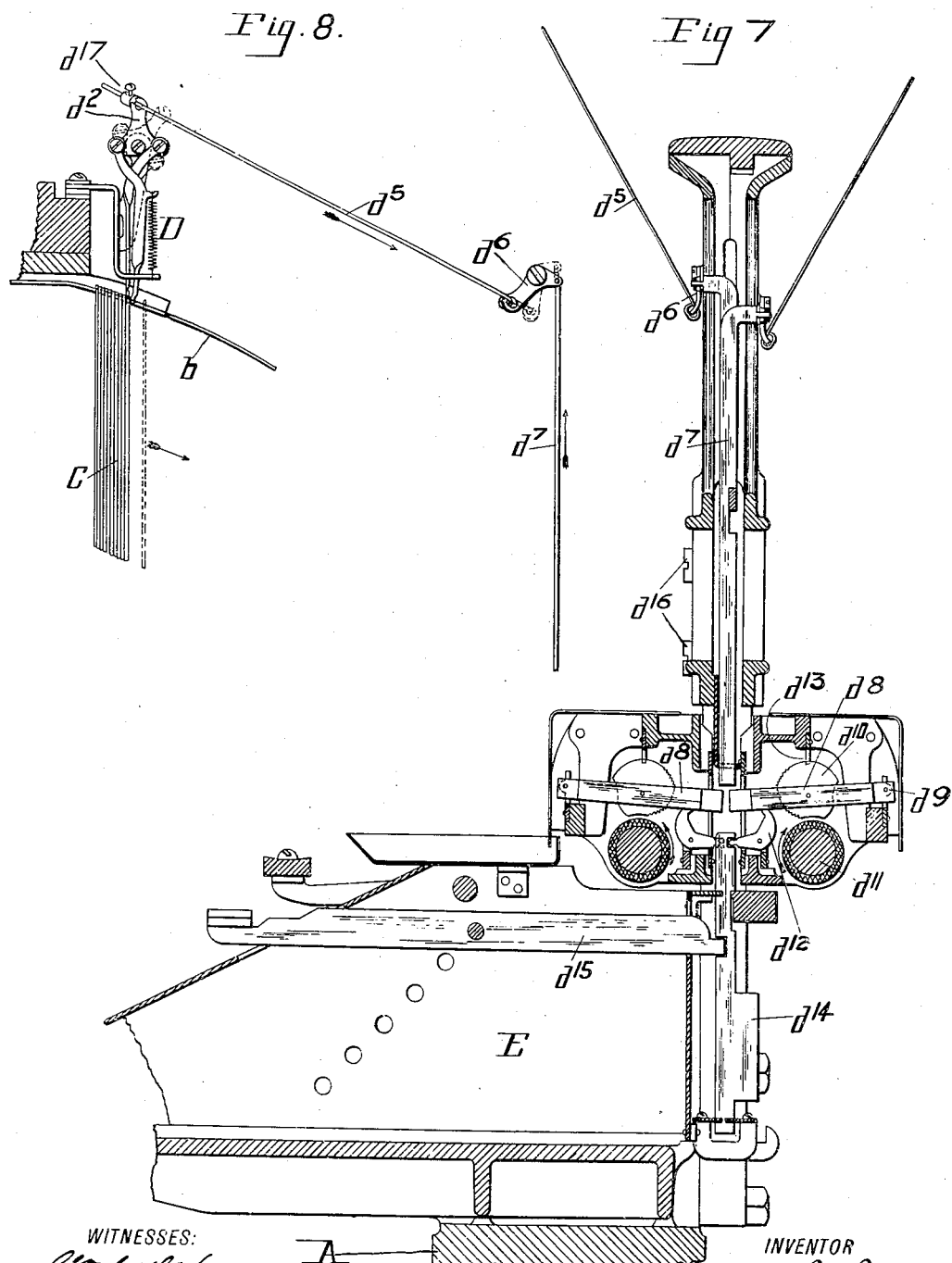

J. R. ROGERS.
LINE CASTING MACHINE.
APPLICATION FILED MAR. 3, 1909.
955,695.
Patented Apr. 19, 1910.
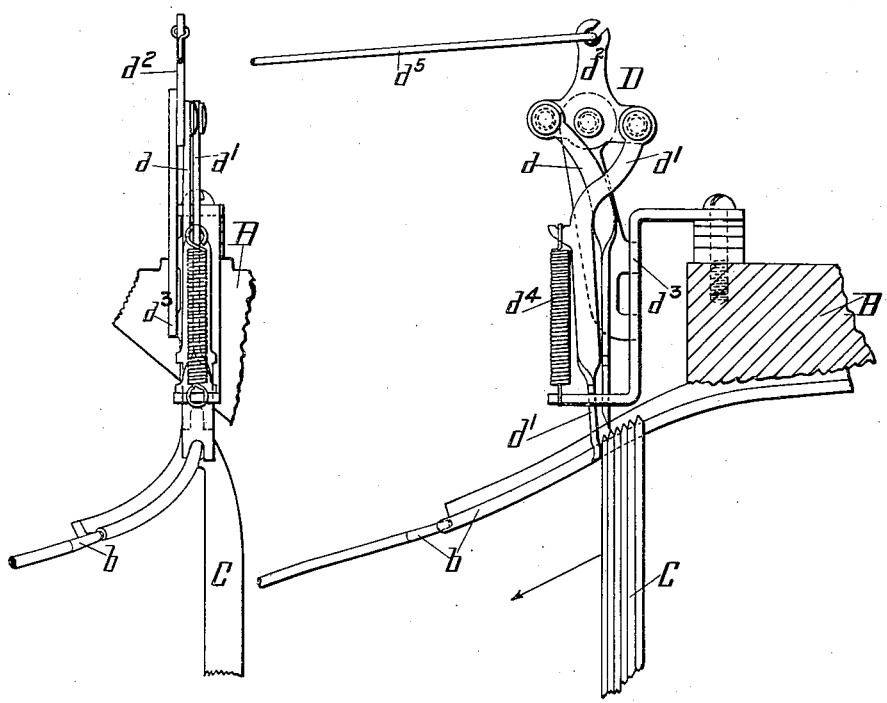
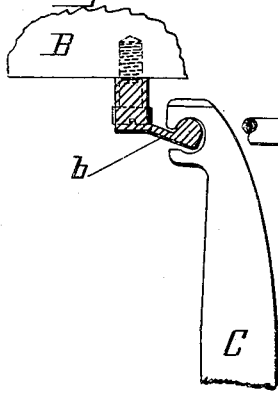
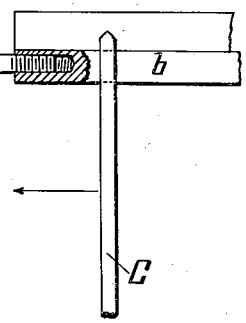

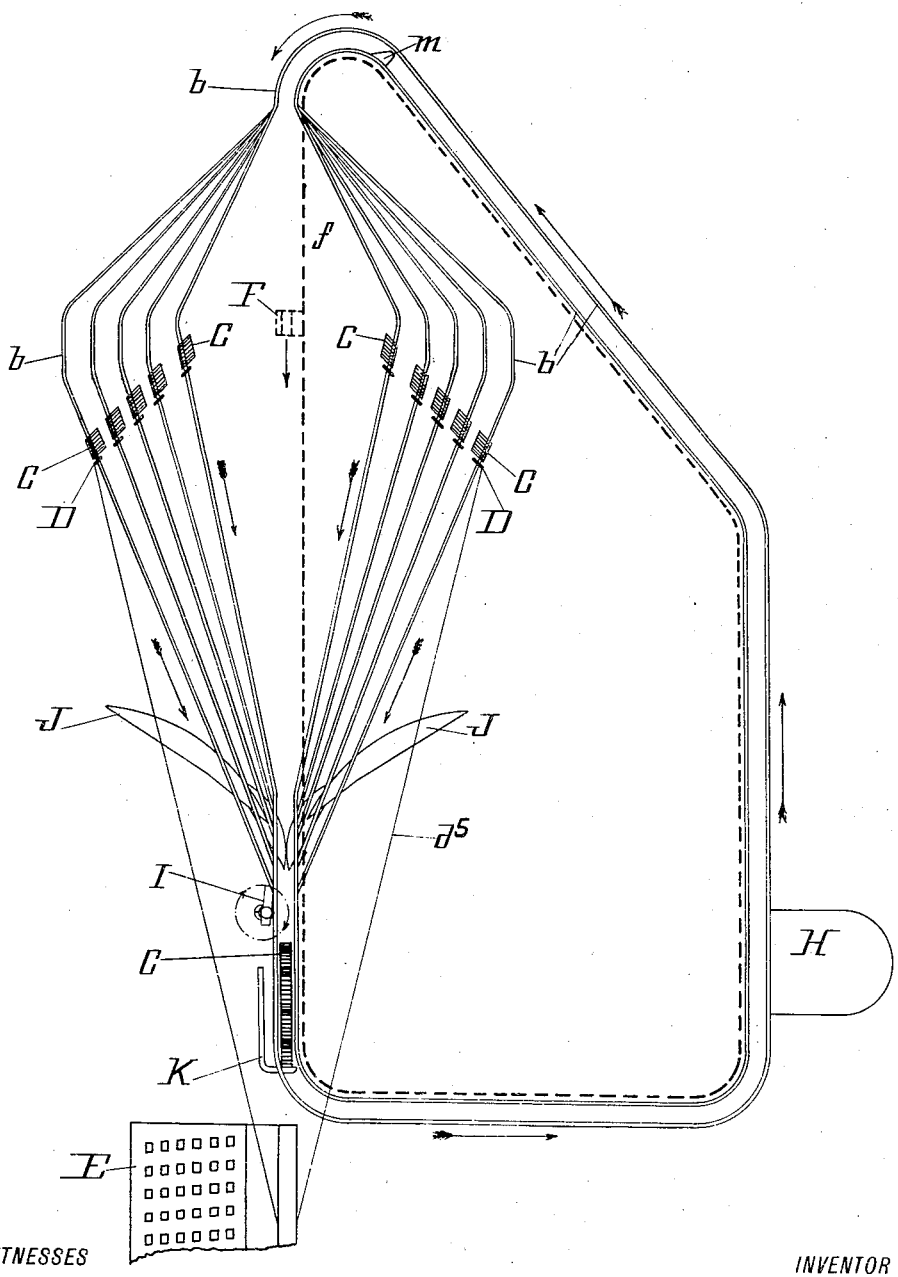

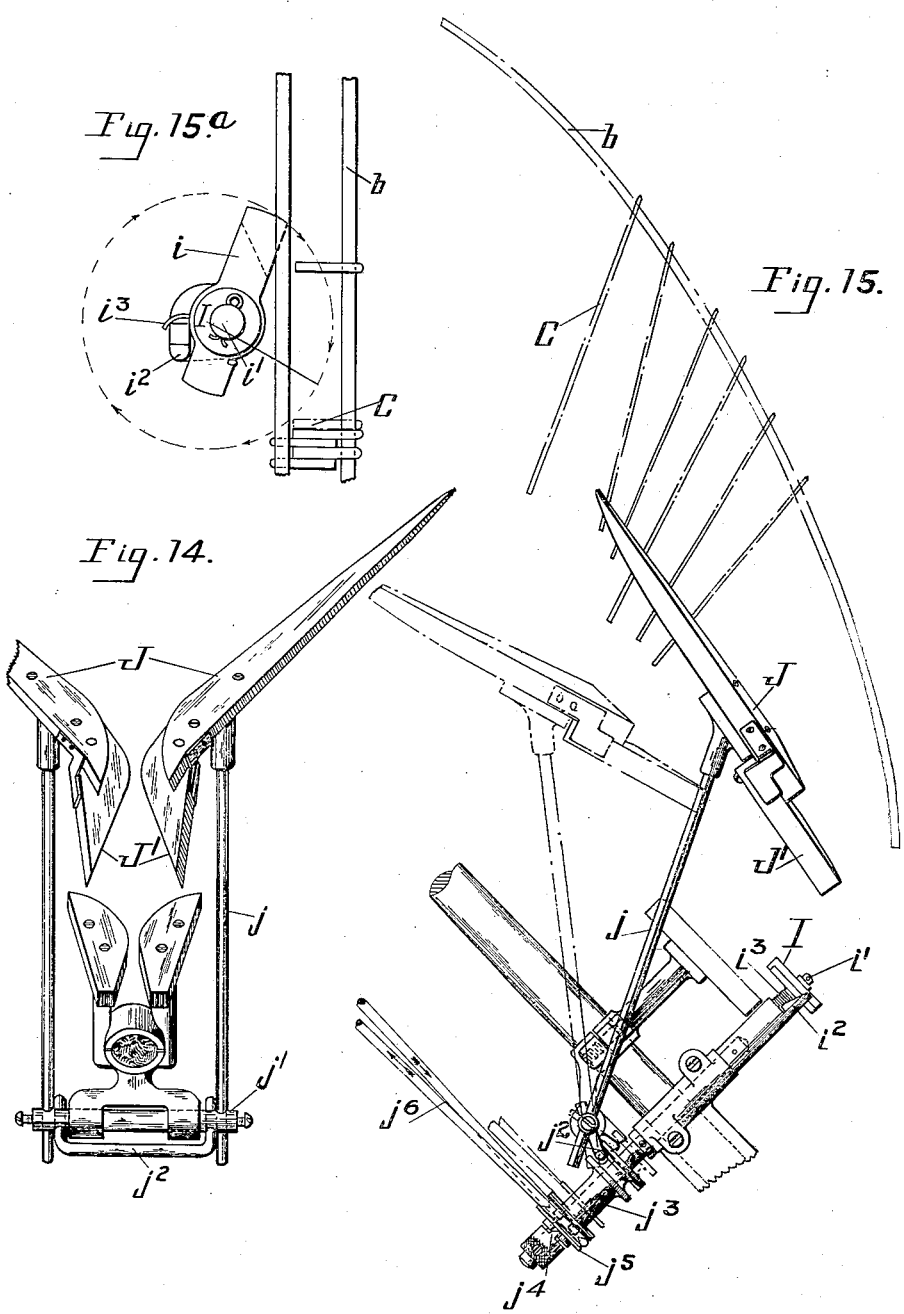

J. R. ROGERS.
LINE CASTING MACHINE.
APPLICATION FILED MAR. 3, 1909.
955,695.
Patented Apr. 19, 1910.
21 SHEETS—SHEET 10.
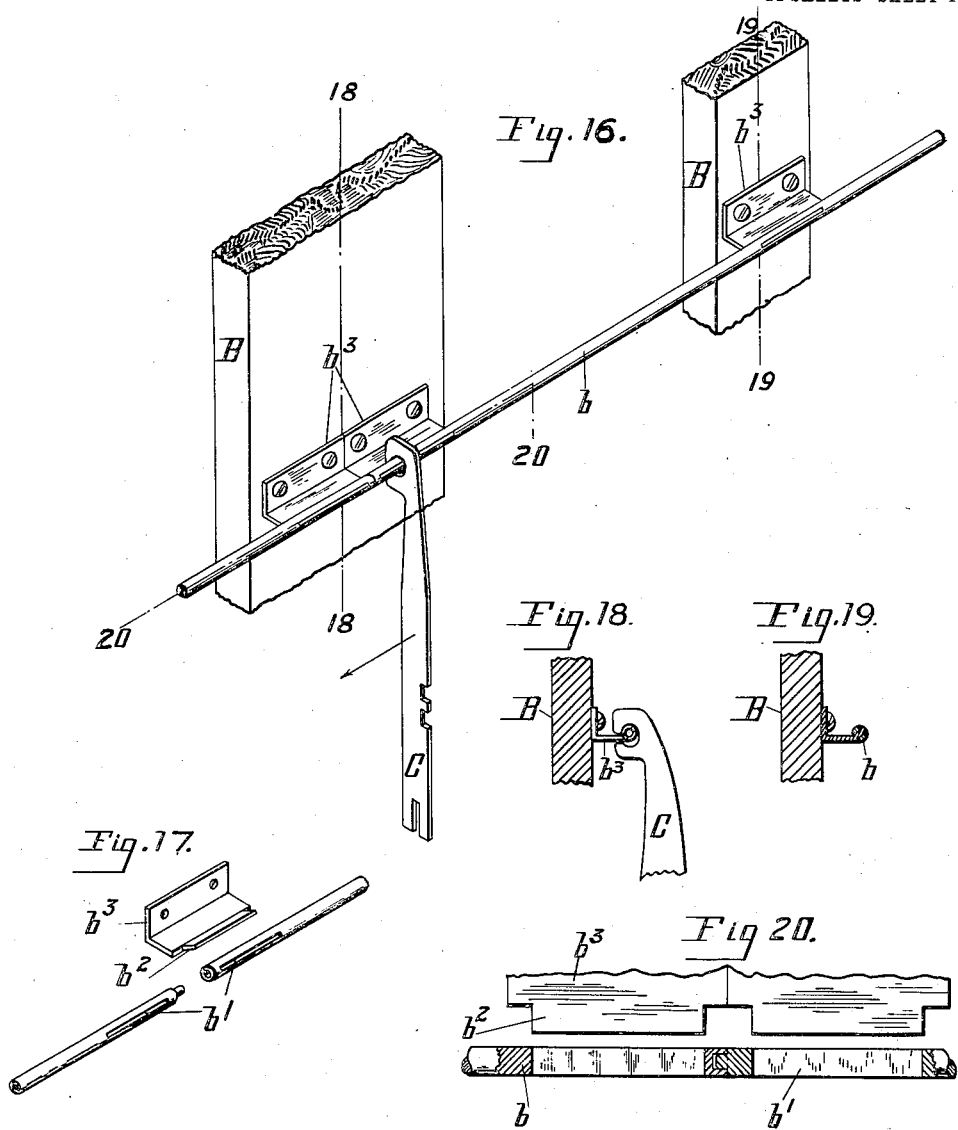

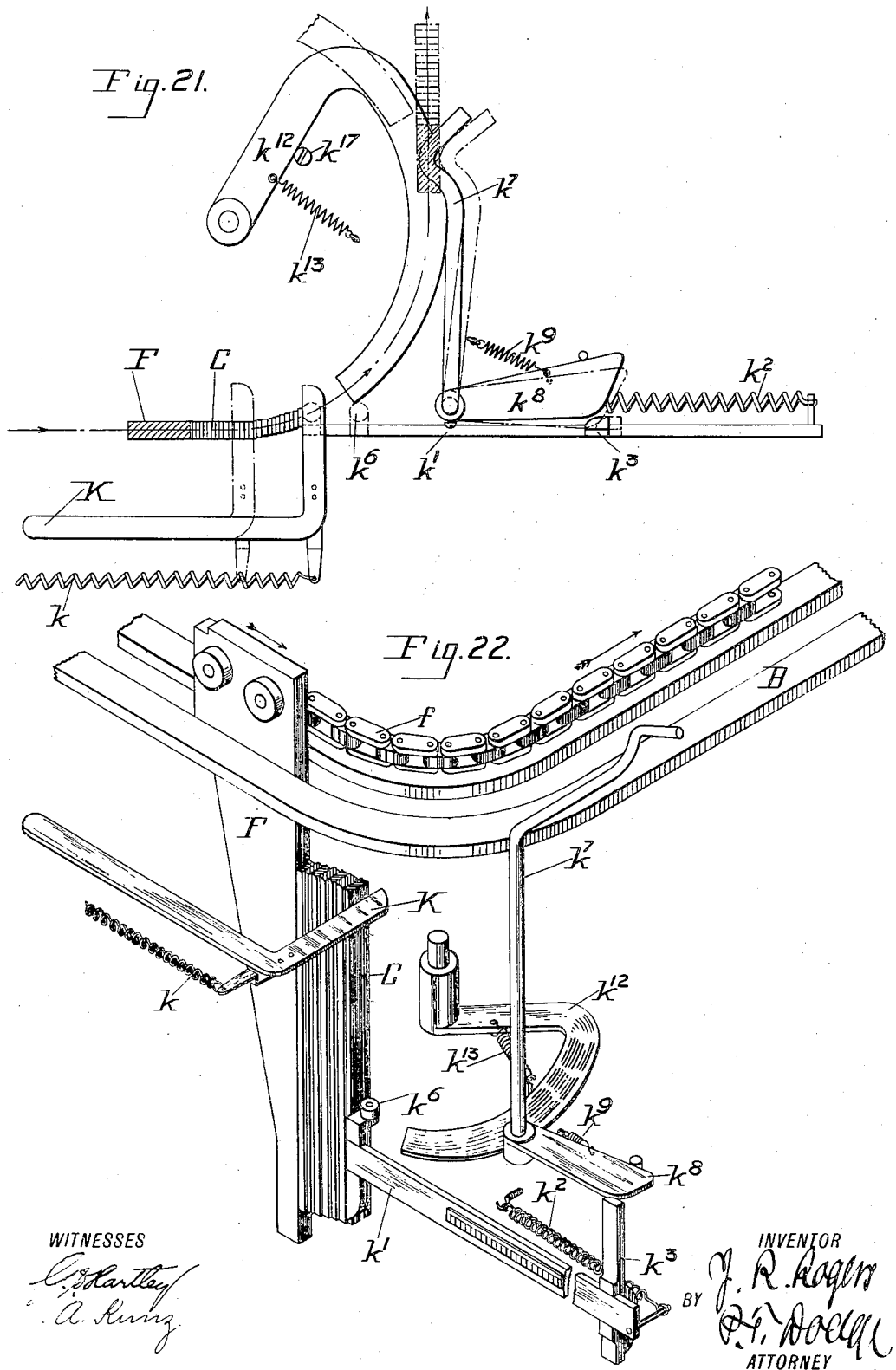

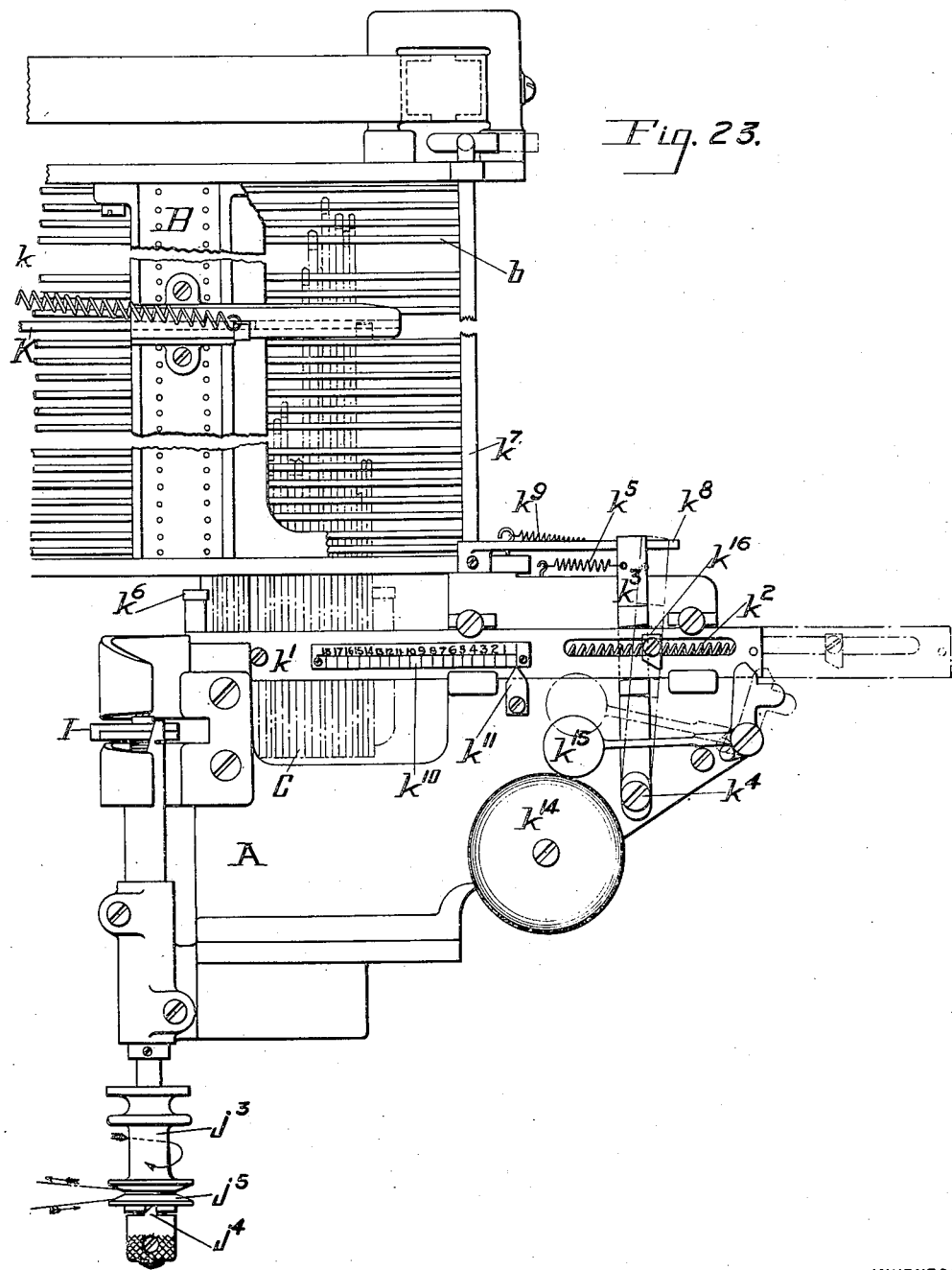

J. R. ROGERS.
LINE CASTING MACHINE.
APPLICATION FILED MAR. 3, 1909.

955,695.

Patented Apr. 19, 1910.
21 SHEETS—SHEET 13.

WITNESSES:

INVENTOR
J. R. Rogers
BY
P. T. Dodge
ATTORNEY

J. R. ROGERS.
LINE CASTING MACHINE.
APPLICATION FILED MAR. 3, 1909.

955,695.

Patented Apr. 19, 1910.
21 SHEETS—SHEET 14.

WITNESSES
G. J. Hartley
A. Kurz

INVENTOR
J. R. Rogers
BY
C. J. Woelke
ATTORNEY

J. R. ROGERS.
LINE CASTING MACHINE.
APPLICATION FILED MAR. 3, 1909.
955,695.
Patented Apr. 19, 1910.
21 SHEETS—SHEET 15.
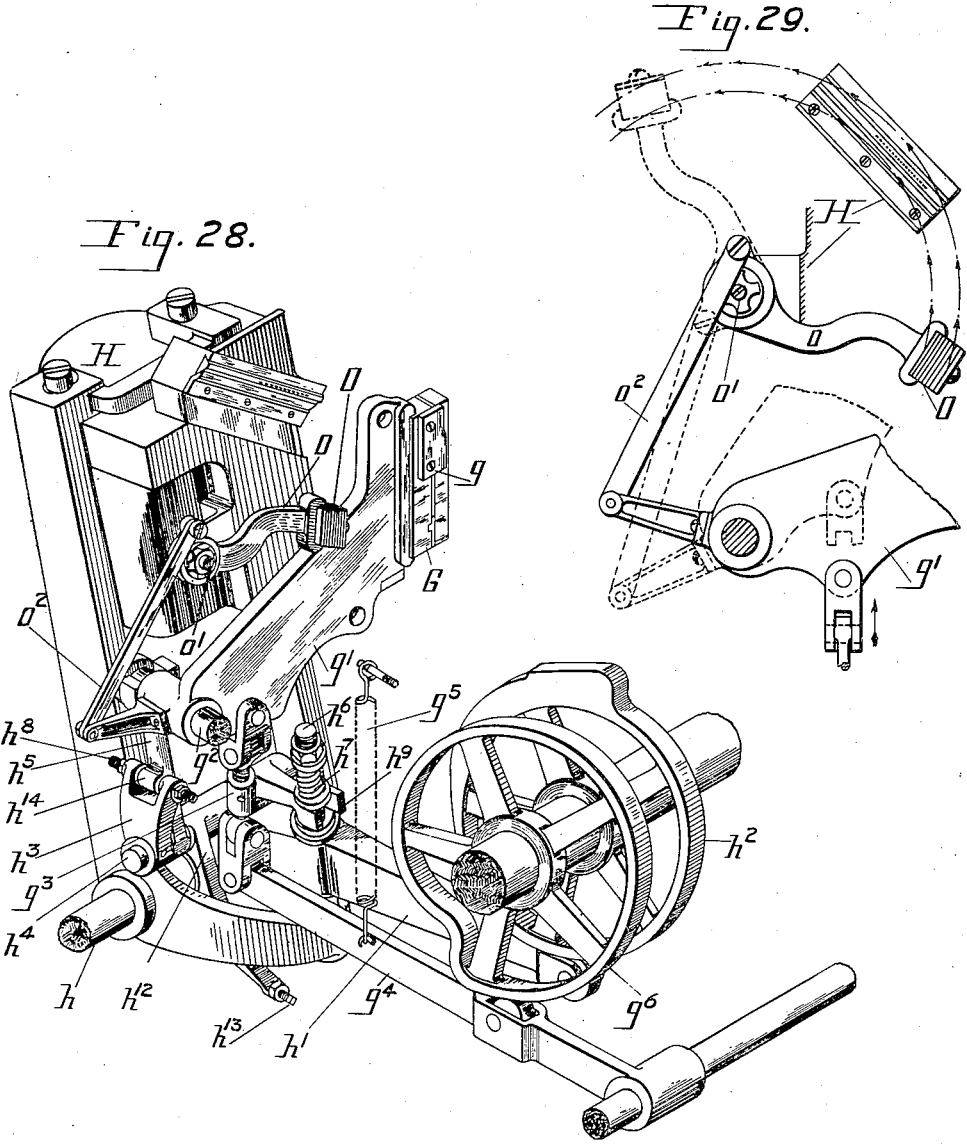

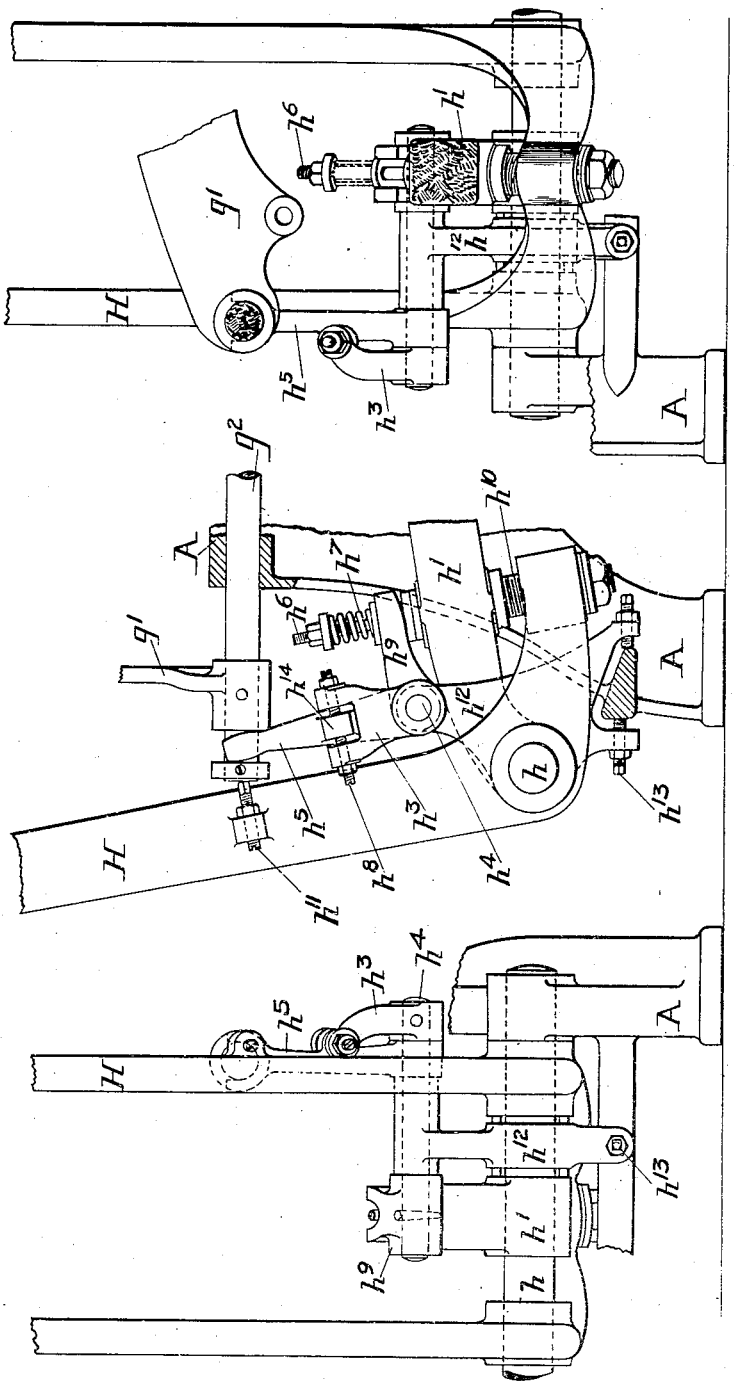

J. R. ROGERS.
LINE CASTING MACHINE.
APPLICATION FILED MAR. 3, 1909.
955,695.
Patented Apr. 19, 1910.
21 SHEETS—SHEET 17.
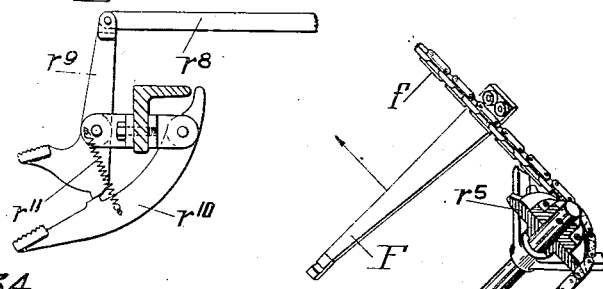
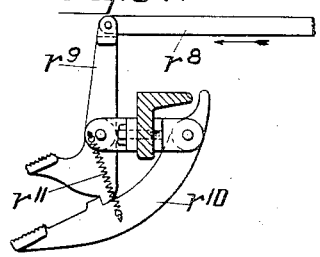
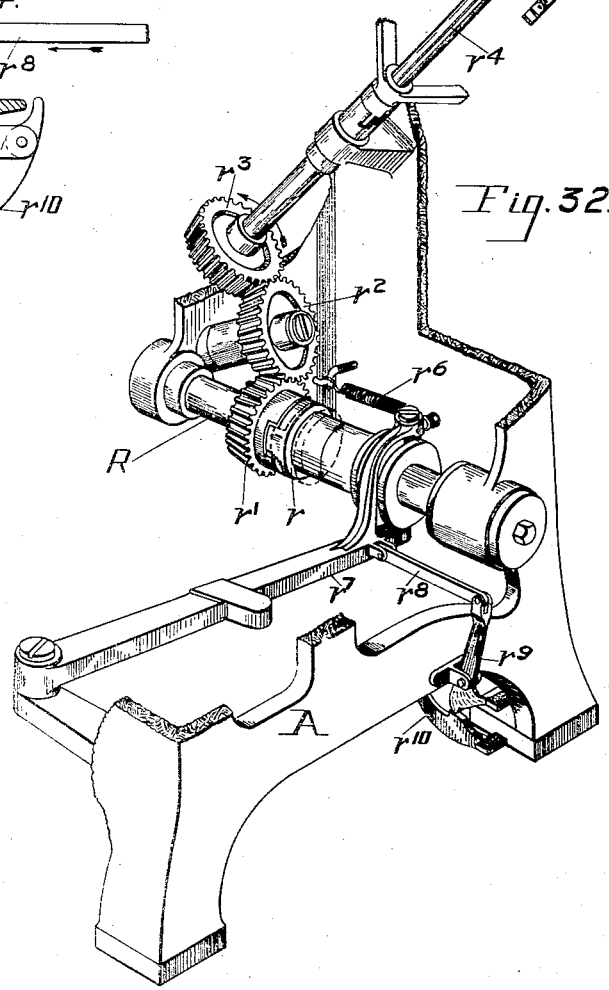
WITNESSES
INVENTOR
BY J. R. Rogers
ATTORNEY

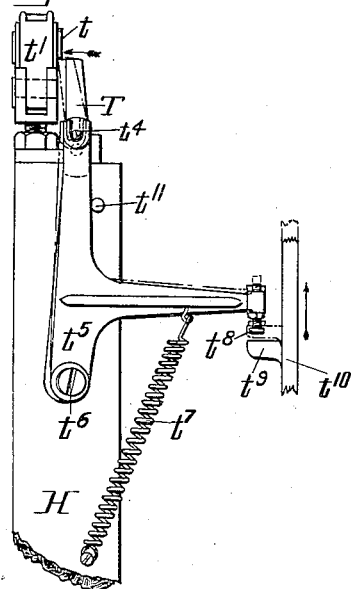
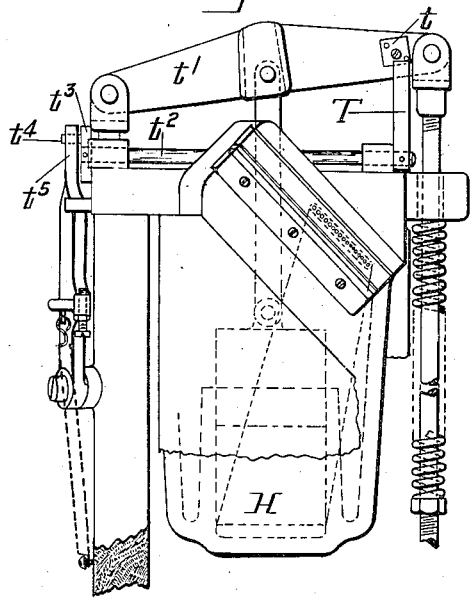
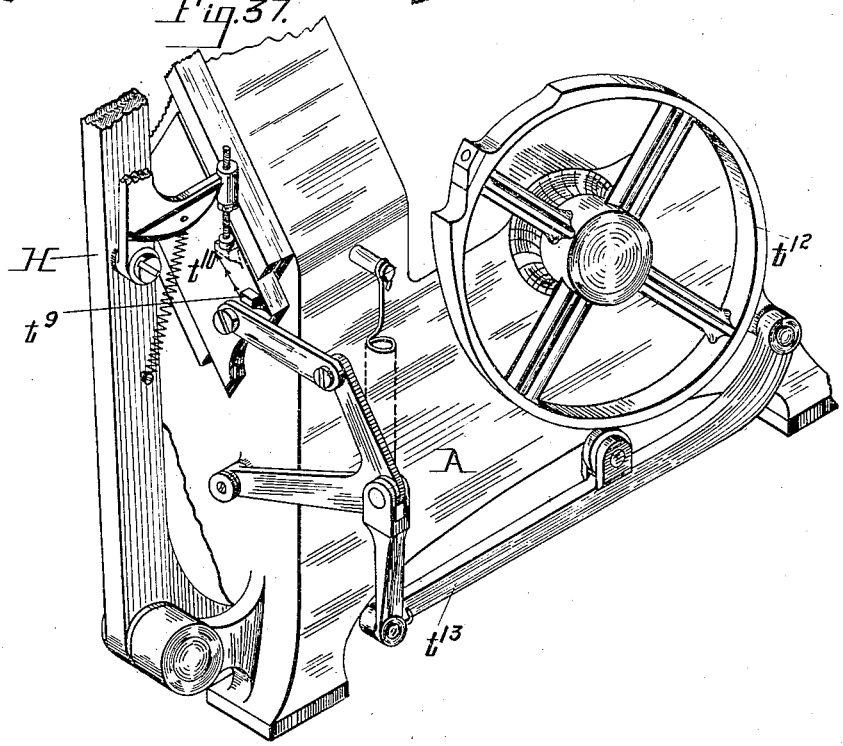

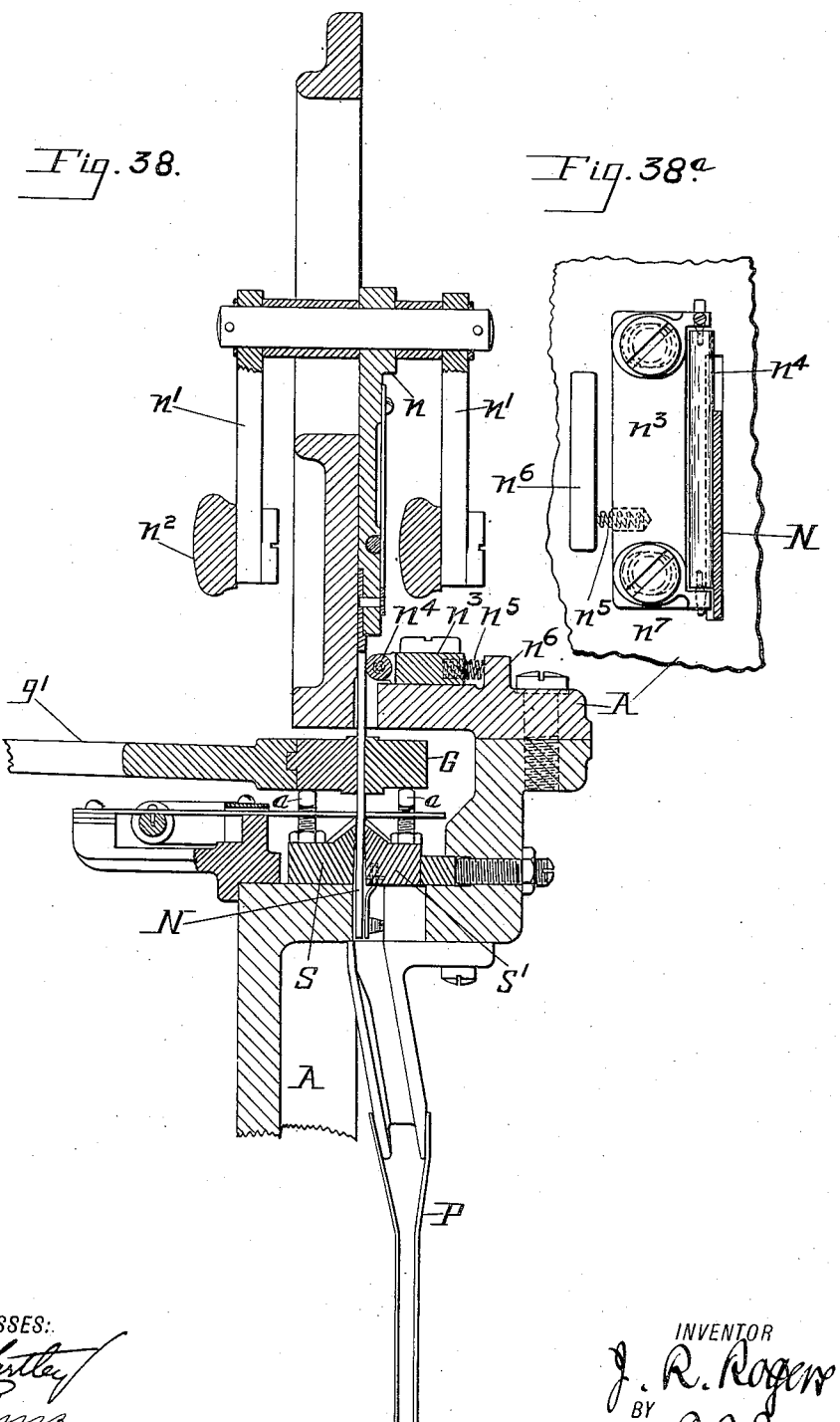

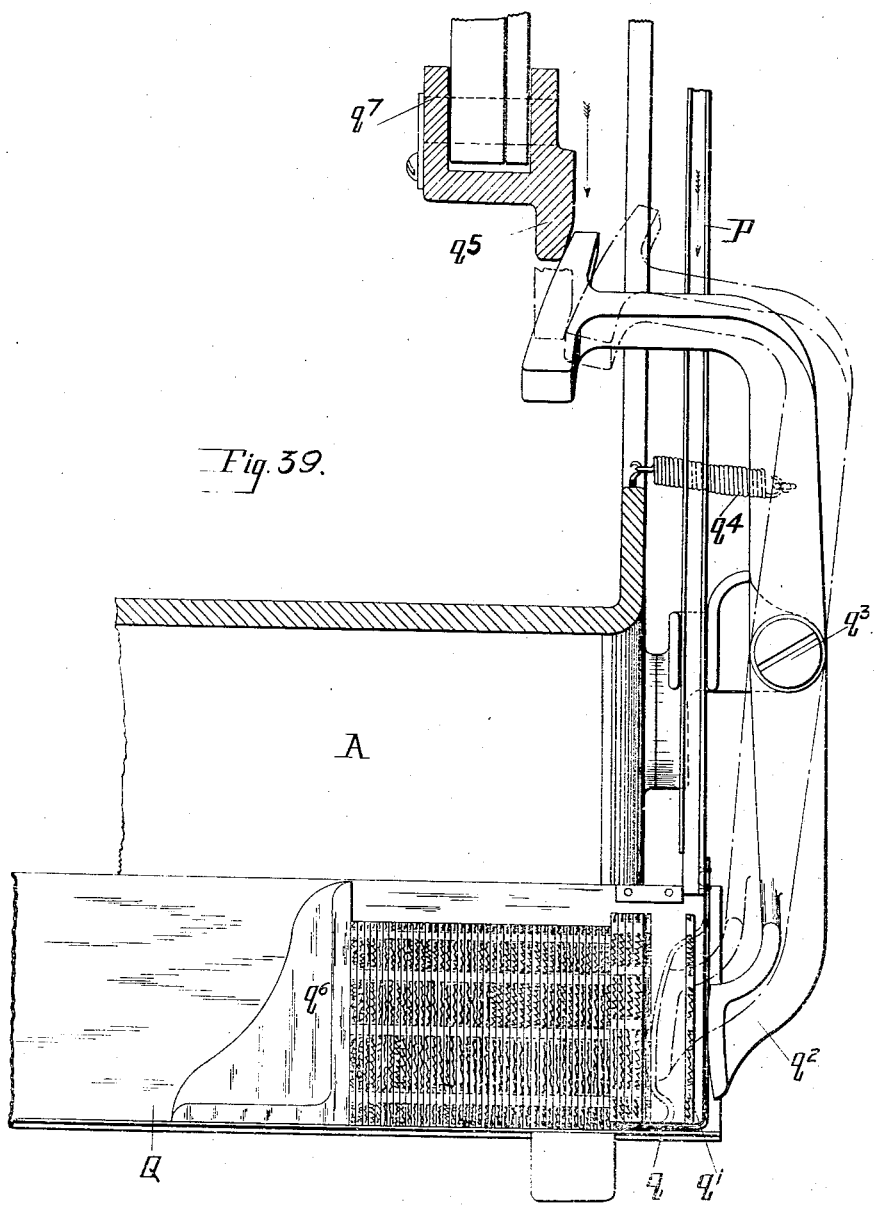

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINE-CASTING MACHINE.

955,695. Specification of Letters Patent. Patented Apr. 19, 1910.

Application filed March 3, 1909. Serial No. 481,031.

*To all whom it may concern:*

Be it known that I, JOHN R. ROGERS, of the borough of Brooklyn, county of Kings, and State of New York, have invented a new and useful Improvement in Line-Casting Machines, of which the following is a specification.

This invention has reference to line casting machines, so-called, for producing printing slugs or bars, each bearing on one edge, properly justified, the characters to print an entire line of a page or column.

It relates particularly to machines of the general construction represented in Letters Patent of the United States to J. R. Rogers Nos. 679,481 and 861,770, wherein a series of matrices representing the various characters and spacers are arranged to travel around and around on fixed endless guides. Each guide carries matrices for the same character. The guides are arranged in converging lines for a portion of their length, in order to assemble the designated matrices in line; then continue in parallel lines to guide the matrices to the casting point and onward to the distributing point, after which they diverge to distribute the matrices to the points from which they started.

The invention consists in various improvements in the devices for sustaining and guiding the matrices; in a keyboard mechanism for actuating the escapements which retain and release the matrices; in details of the escapements; in devices for guiding the released matrices to the end of the line; in means for resisting the advance of the line in course of composition and determining its length; in means for holding the line of matrices in compact form as it is carried upward and rearward to the point where the guides, diverge for distributing purposes; in means for locking the line at the casting position; in means for controlling the movement of the swinging mold; in means for wiping the mouth of the pot to remove the dross and other foreign matters; in means for controlling at will the movement of the finger which transfers the composed line; in means for preventing the casting action in the event of the matrix line being too short; in means for determining the relations of the mold, trimming knives, etc., during the delivery of the slug; in means for receiving and assembling the slugs when delivered from the molds.

Figure 24:
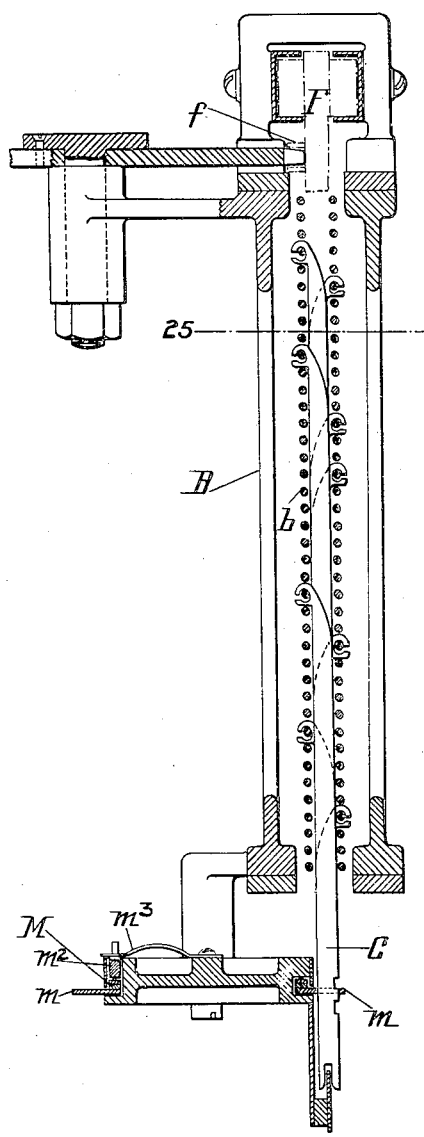
Figure 25:
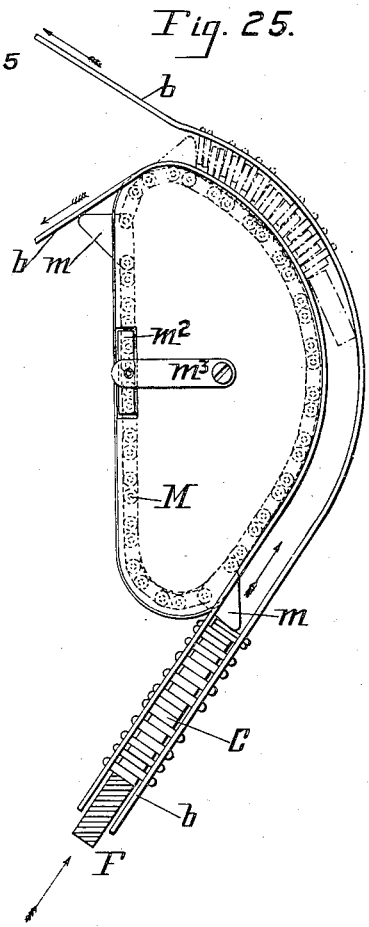
Figure 26:
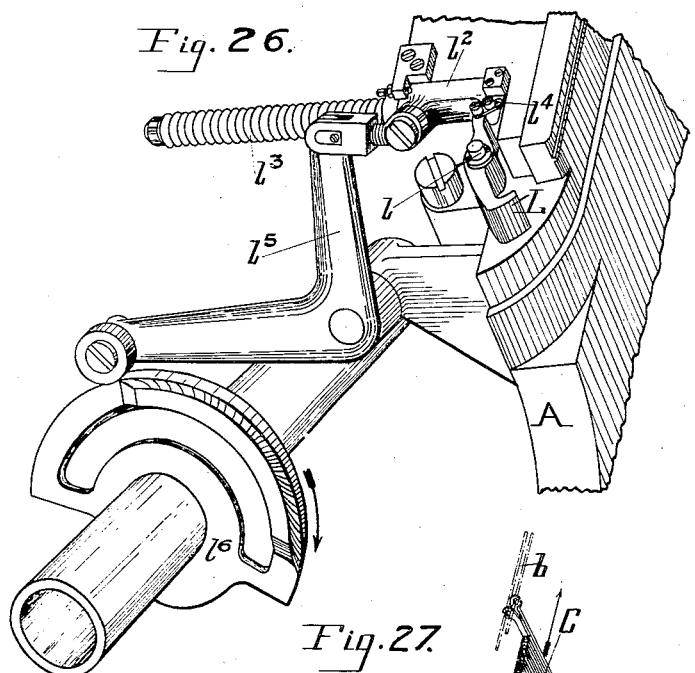
Figure 27:
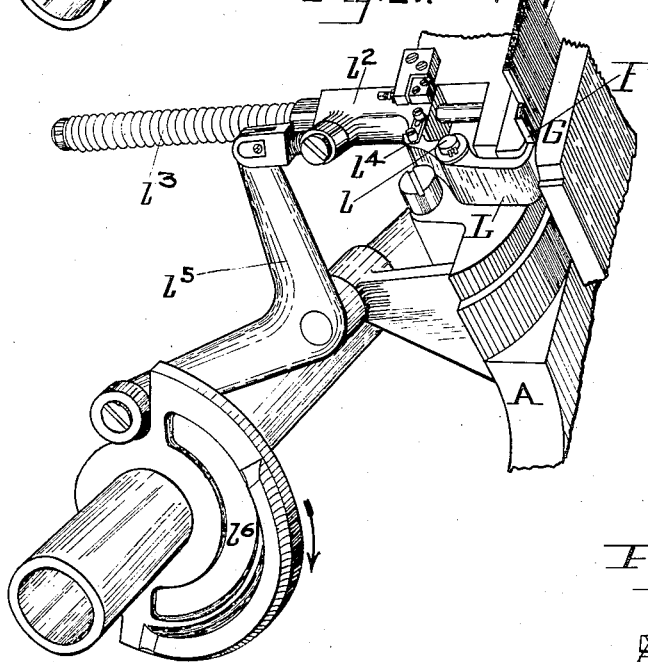
Figure 26A:
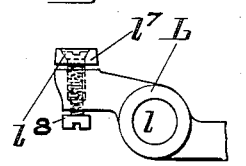

Referring to the accompanying drawings: Figure 1 is a front elevation of the machine. Fig. 2 is a rear elevation of the same. Fig. 3 is an elevation looking from the right side. Fig. 4 is an elevation looking from the left side. Fig. 5 is a front elevation of the keyboard mechanism, the upper and lower parts being separated, and the operative position of the upper part indicated by dotted lines. Fig. 6 is an end view of the same looking in the direction indicated by the arrow in Fig. 5. Fig. 7 is a vertical cross section through the keyboard mechanism on the line 7—7 Fig. 5. Fig. 8 is a sectional elevation representing one of the matrix releasing escapements and the attendant parts. Figs. 9 and 10 are respectively an edge view and a side view of one of the escapements and adjacent parts on a larger scale. Figs. 11 and 12 are respectively a cross section and a side elevation of a portion of one of the matrix guides. Fig. 13 is a diagram illustrating the general arrangement of the endless wires or tracks on which the matrices travel. Fig. 14 is a front elevation of parts which guide the descending matrices successively into the assembling throat or channel. Fig. 15 is a side elevation of the same. Fig. 16 is a perspective view illustrating a portion of one of the matrix sustaining guide wires or tracks, with the supports therefor. Fig. 17 is a perspective view of parts of this guide, separated. Fig. 18 is a cross section on the line 18—18 Fig. 16. Fig. 19 is a cross section on the line 19—19 Fig. 16. Fig. 20 is a longitudinal section on the line 20—20 of Fig. 16, showing the connecting ends of the guide sections before their application to the support. Fig. 21 is a plan view showing the devices for resisting and measuring the length of the matrix line during its composition. Fig. 22 is a perspective view showing the parts indicated in the preceding figure, together with adjacent parts. Fig. 23 is a side elevation of the parts shown in the two preceding figures, together with parts adjacent thereto. Fig. 24 is a vertical cross section through the upper rear end of the machine, showing the devices for supporting and guiding the composed matrix line as it approaches the distributing point. Fig. 25 is a cross section of the same on the line 25—25 of the preceding figure. Figs. 26 and 27 are perspective views showing the means for confining the rear end of the matrix line in the casting position. Fig. 28 is a perspective view showing the melting pot, the mold and mold arm, the pot mouthpiece wiper and their actuating devices. Fig. 29 is a front elevation illustrating the action of the pot mouthpiece wiper. Figs. 30 and 31 are respectively side and front elevations of the mechanism for controlling the movements of the mold carrying arm. Fig. 32 is a perspective view of the mechanism operating the endless chain which carries the finger for advancing the composed line of matrices from the assembling to the casting point, and thence to the distributing point. Figs. 33 and 34 show details of the foregoing mechanism. Figs. 35 and 36 are respectively a side view and a front view of the pump stop to prevent the casting action if the matrix line is too short. Fig. 37 is a perspective view illustrating the same parts. Fig. 38 is a cross section through the mold trimming knives, ejector and adjacent parts on the line 38—38 of Fig. 1. Fig. 39 is a plan view, and Fig. 40 a perspective view of the slug receiving galley and the parts for delivering slugs thereto. Fig. 15$^a$ is a plan view of the pusher or packer for assembling the matrices. Fig. 26$^a$ is a plan view of the line-confining jaw, showing the means for adjustment. Fig. 31$^a$ is a rear elevation of the mechanism for controlling the movements of the mold carrying arm. Fig. 38$^a$ is a front elevation of the ejector blade guide, showing its relation to the ejector blade and to adjacent parts.

In its general construction and mode of operation the machine herein shown is essentially the same as that represented in Patents Nos. 679,481 and 861,770, referred to above, and it is to be understood that with the exception of the parts hereinafter specifically described and claimed, the machine may be identical in all respects with that shown in the patents, or of any other similar or suitable construction.

Referring to the drawings, A represents the main frame or base of the machine, and B the inclined top frame supporting the series of endless guide wires, $b$, from which the respective groups of matrices, C, and spacers are suspended, and upon which they are arranged to travel. These guides are arranged as in the previous machine, and as indicated in Fig. 13, in downwardly converging lines toward the front of the machine, where they are assembled in two vertical tiers, so that the matrices, released individually at the storage points by the escapements, D, are permitted to slide downward one after another, and assembled in a common line between the parallel portions of the guides. From this point the guides are continued in parallel lines to the right, and thence upward past the casting point to the upper rear end of the machine, where they again diverge until they reach the escapements, where the matrices are stored; so that the lines, after being composed, may be carried between the guides, first to the casting position, and thence upward to the rear end of the machine, whence the matrices descend by gravity along their respective guides to the points from which they started,—the line being thus distributed.

The escapements, D, for releasing the individual matrices from the groups, may be of the same construction as those represented in Patent 679,481, or of any other suitable construction.

E represents the keyboard, comprising a series of finger-keys representing the various characters and spaces, and connecting through an intermediate mechanism hereinafter described, to release the matrices during the composition of the line.

The composed lines are advanced along and between the guides to the casting and distributing points by a finger, F, dependent from an endless chain, $f$, which follows the path indicated by dotted lines in Fig. 13.

The casting mechanism consists principally of a slotted swinging mold G, open on both sides, and a swinging metal pot, H, from which molten metal is delivered to one side of the mold, while the opposite side of the latter is in contact with the line of matrices.

In their general construction and arrangement the foregoing parts are similar to those represented in Patents 679,481 and 861,770, above referred to.

Passing now to a description of my improvements, I will first describe the escapements for releasing the matrices, and the keyboard mechanism for actuating the same, as illustrated more particularly in Figs. 4 to 10, inclusive.

As shown in Figs. 9 and 10, each of the escapements, D, consists of two vertically guided fingers, $d$ and $d^1$, pivoted to opposite ends of a centrally pivoted lever, $d^2$, sustained by an arm or bracket, $d^3$, attached to the top frame, B. The lower ends of the fingers $d$ and $d^1$, which rise and fall alternately, are slotted to straddle the guide $b$ in such manner that as the finger $d^1$ rises to release the foremost matrix, the next matrix in the group is held momentarily by the other finger. A spring, $d^4$, serves to hold the finger $d^1$ normally downward.

At each oscillation of the lever $d^2$ one matrix is released, and permitted to descend the guide wires toward the assembling point.

Each of the escapement levers $d^2$ receives motion through a wire, $d^5$, as shown in Figs. 5, 7 and 8, from an angular lever, $d^6$, pivoted to the keybord frame, and actuated by a vertical slide, $d^7$, therein. There is a series of these slides, one for each escapement, and they are guided vertically in the top of the keyboard. The lower end of each slide stands directly over the free end of a vertically swinging yoke, $d^8$, pivoted at $d^9$, and containing a vertical cam, $d^{10}$, overlying a constantly rotating roll, $d^{11}$. The free end of each yoke is supported normally by a pivoted dog, $d^{12}$, to keep the cam $d^{10}$ out of contact with the roll—the cam held against rotation at such time by engagement with an overlying fixed finger, $d^{13}$. Each of the dogs $d^{12}$ is connected with a vertical slide, $d^{14}$, which is in turn connected with a finger key lever, $d^{15}$, pivoted at its middle. When the key is actuated, it disengages the corresponding dog $d^{12}$ from the cam yoke, permitting the latter to fall and carry the cam into contact with the roll, and out of engagement with the stop pin. As the cam is rotated by the friction of the roll, it lifts the yoke beyond the original position, causing it to actuate the slide $d^7$, and, through the intermediate parts, to reverse the position of the escapement D, so as to release a matrix or a spacer that it may pass to the line. The finger key being released, the dog $d^{12}$ supports the falling yoke in its original position, and the parts remain at rest until the finger key is again actuated; the escapement at the same time resuming its first position.

So far as the cams, finger keys and driving rolls are concerned, the parts shown are substantially identical with those represented in United States Patent to Dodge 530,931, and they are claimed herein only in combination with the other parts.

It will be observed that the keyboard is arranged in front of the machine, and at right angles to the throat or channel in which the line of matrices is assembled, so that the operator, sitting at the keyboard, may view the matrices in the line and conveniently reach the line with his left hand, for the purpose of reading the characters therein, and of removing and adjusting the matrices as may be required. This arrangement of the keyboard is rendered possible by the employment of the angular levers from which the escapement operating wires lead toward the various paths indicated in Figs. 1, 3, 5, etc. It will be observed that these wires overlie the guide wires, and that they are in such position that they do not interfere with access to other parts of the machine.

It will be observed that the slides $d^7$, for actuating the levers $d^6$, are arranged in a common row, but that their upper ends are deflected, as shown in Fig. 7, alternately to the right and left, and also that the slides are made of different heights; in other words, terminate at different levels; and this in order to give the necessary space between them for the introduction of the levers $d^6$, as shown in Fig. 5.

It will be observed that in the upper part of the escapement D is formed an open, oblique slot, into which the escapement operating wires $d^5$ are laid,—a collar, $d^{17}$, upon the wire, serving to limit the movement of the wire and prevent its disengagement in the usual operation of the machine. The wires $d^5$ may therefore be laid into or removed from the escapements with ease and despatch. As they were constructed heretofore, these escapements D were formed with a closed slot or hole, and the wire $d^5$ was hooked into this hole. This form of construction rendered the assembling of the wires into the escapements or their removal therefrom a tedious and difficult matter. Combined with this, the keyboard was also constructed formerly in one member, and when, for various reasons unnecessary to enumerate, it was desired to connect or to disconnect the keyboard with its escapement wires and the main body of the machine, the operation was prolonged and laborious, and required the services of two attendants skilled in such work.

One of my improvements is intended to reduce this labor to a very great extent. I attain this end by forming the escapements D with an open slot as described above, and by so constructing the keyboard that the upper portion of it, to which the escapement wires are attached, may be removed by merely taking out the small screws $d^{16}$ and lifting it upward clear of the keyboard. The act of lifting it from the dotted to the full lines as shown in Figs. 5 and 6, combined with a co-incident lifting of the escapement wires from the open slots of the escapements D, may be performed quickly and effectually by a single attendant, and without destroying the adjustment of the wires.

The essentials of my improvement lie in such a construction of the adjacent and co-operating parts of the machine, as will enable the escapement wires with their angular levers and vertical slides, etc., to be quickly removed in one member. Devices for this purpose may be very widely varied in form and arrangement of parts without departing from the spirit of my invention.

Passing now to another improvement, means for guiding and assembling the released matrices, attention is directed to Figs. 4, 13, 14 and 15, in which I represents a wiper or pusher on the upper end of an upright arbor, for the purpose of pushing the descending matrices forward one after another against the rear end of the line as it is composed between the parallel portions of the guides $b$, as shown in Fig. 13.

As the pendent matrices and spacers descend the guides toward the wiper and the throat, they have sometimes a tendency to sway laterally, so that they will not readily enter.

In order to guide their lower ends and direct them into the throat, I provide beneath the guides and in advance of the throat, the two sets of inclined converging guides, J and $J^1$. These are carried on the upper ends of arms $j$, sustained in a horizontal rock shaft, $j^1$, so that in the event of the matrices becoming entangled, so that they fail to enter the assembling channel, the guides J may be rocked backward, as indicated by dotted lines in Fig. 15, away from their operative positions and from the wiper I, thus giving the operator free access to the lower ends of the matrices, in order that he may adjust, disentangle, or remove them. While this is being done, it is desirable to stop the rotation of the wiper or packer I. To this end the spindle or arbor which carries the packer is provided at the lower end with a driving sleeve, $j^3$, arranged to slide endwise thereon, and having its lower end notched as shown in Fig. 15, to engage a driving tooth, $j^4$, on the spindle. This sliding sleeve or clutch carries a pulley, $j^5$, through which the sleeve receives motion from the belt $j^6$.

The rock shaft which carries the guides J has an arm, $j^2$, which enters a grooved collar at the upper end of the driving sleeve, so that when the guides are thrown backward from the operative position, this arm will lift the sleeve and release the spindle from the influence of the driving pulley, so that its rotation will cease.

The wiper or packer I consists essentially of a finger, $i$, pivoted to a collar on the upper end of the spindle at the point $i^1$, eccentric to the spindle. It is held against a stop shoulder, $i^2$, by a spiral spring, $i^3$, the arrangement being such that as the spindle is rotated, the finger would act upon the successive matrices, and push the matrices and the composed line forward in the assembling throat or channel. If, however, the line meets with excessive resistance, the spring will yield, and the finger will be permitted to turn backward and pass the edges of the matrices while the rotation of the spindle continues. The essence of the invention in this regard lies in the employment of a yielding wiper or finger to carry the matrices forward, and, it will be understood by the skilled mechanic, the details may be widely modified without changing the principles of action.

It will be noted that the guide wires upon which the matrices travel diverge at the distributing point from the common path toward a series of storage points; from which they again converge toward a common path in a downward direction; and that the various guide wires are differently curved and bent, to afford the clearances necessary for the matrices to pass freely along their various guides. It is essential, therefore, that these clearance spaces are always maintained, and that the guide wires be prevented from turning about in their supports, thereby diminishing these spaces and interfering with the free passage of the matrices along the guides. As constructed heretofore, the guide supports have not afforded this necessary means to prevent torsion of the guide wires, and one of my improvements is directed to this end. I form these guides and supports as shown in Figs. 16 to 20, the guide wires $b$ having slots, $b'$, formed in them longitudinally to their axis, to receive the tongues $b^2$ of the supports $b^3$; and the tongues being tightly driven into the slots, the support is in turn secured to the top frame B. This construction holds the wire guide very rigidly and effectually prevents it from turning. Where the ends of two portions of these guides or wires, $b$, come together, they are alined so as to present an unobstructed path for the matrices, as shown in detail in Figs. 17 and 20. To effect this alinement, the end of one of the wires is turned down or reduced in diameter for a short distance, and a suitable recess is formed in the end of the opposing wire to receive this reduced portion. So constructed, the wires in their full body diameter will register exactly and smoothly one with the other, allowing the matrices to pass freely along the guides.

The essentials of my improvement lie in so forming the support and the guide wire at their point of connection as to hold the wire rigidly in any given curved position, and so prevent it from twisting about or being displaced by torsional strains.

Another improvement in connection with those guide wires which converge from the different storage points in a downward direction to the common assemblage point I have illustrated in Figs. 9 to 12. Here is shown the upper portion of these assemblage wires. In practice it has been found that through extended use these descending guides are liable to become somewhat loose and slack, thereby interfering with rapid and accurate assembling. I have, therefore, provided means shown in detail in Fig. 12, whereby these guide wires may be adjusted from time to time, as may be necessary, to the required tension. That portion of the guide which is shown as secured immediately to the top frame B is made from a solid piece of metal, such as steel, and has a threaded hole into which the opposing end of the guide wire, suitably tapered and threaded, may be screwed until the wire has been brought to the required tension. Whenever the wire develops signs of slackness, the attendant merely removes the nearest guide support, $b^3$, from the frame B and screws the wire into the solid support as far as may be necessary, replacing the support as before. The essence of this improvement lies in the interposition of means throughout the length of the guide wires, which shall not interfere with the free passage of the matrices, and which shall afford the operator or attendant the necessary means for adjusting the tension of the guide wires to a greater or lesser degree.

Passing now to another feature of the invention,—means for holding the matrices in close order during composition, and for resisting the advance of the line, attention is directed to Figs. 21, 22 and 23, in which K represents a resistant in the form of a slide guided in the main frame, and having one end extended laterally to lie in front of and resist the foremost matrix in the line. This slide is urged toward the line by a spring, $k$, and as the line is increased in length, the slide is forced gradually backward, in the manner indicated by dotted and full lines in Fig. 21.

When the completed line is advanced toward the casting position by the carrier finger before referred to, the line is pushed forward against the resistant K in a curved path, until finally it is carried past the end of the resistant, which is thereupon returned to its original position by the spring.

As an additional resistant to the composed line, and as an indicator to show the length of the line, that the operator may know when to cease composition, I mount in the frame a second slide, $k^1$, having one end in position to abut against the line in course of composition, as clearly shown in Figs. 21, 22 and 23, the spring $k^2$ being connected with this slide to urge it toward the advancing line of matrices. As the elongation of the line forces the slide $k^1$ backward step by step, it is held by a friction brake, $k^3$, consisting of a vertical arm, having its lower end mounted on a pivot, $k^4$, and having its upper end notched to straddle or embrace the slide $k^1$, upon which it is caused to bite by the action of the spring $k^5$. As the matrix line is carried forward toward the casting point on a curved path, it passes laterally away from the end of the slide $k^1$, which is preferably provided with a roller, $k^6$, to reduce the wear and friction. After the line has passed the slide $k^1$, the latter must be returned to its original position, preparatory to the composition of the next line. This release of the slide $k^1$ is effected automatically by an upright crank arm, $k^7$, having its upper end arranged in the path of the line carrying finger F, and its lower end provided with an arm, $k^8$, acted upon by spring $k^9$, and having an inclined or beveled end, in position to act on the brake $k^3$. As the finger passes the arm $k^7$, it moves the same, thereby causing the arm $k^8$ to force the brake $k^3$ backward, releasing the slide $k^1$, which is again moved forward to its original position by spring $k^2$.

In order to indicate the length of the line, the slide $k^1$ is provided on one side with a graduated scale, $k^{10}$, passing over a fixed pointer, $k^{11}$. The scale and pointer, which may be transposed if preferred, enable the operator to determine at any instant the length of the composed line, and also enable him, when setting tabular matter or other special matter, to determine the position in the line of the column rules or other characters. As the composed line is carried forward beyond the resisting slides, it is important that it shall meet with further resistance, in order to hold the matrices in compact order until after they have passed around the bend in the guide wires. For this purpose I provide a swinging resistant, $k^{12}$, in the form of a curved arm, carried on the lower end of an upright shaft, and acted upon by a spring, $k^{13}$. The curvature of this arm, and the location of its pivot are such that its end follows the path of the advancing matrix line, until the line resumes a straight path across the front of the machine toward the casting point. As the line advances and the arm recedes, the latter is slowly crowded laterally out of the way, so that the arm can be carried past its end in the manner indicated in Fig. 21, where the final position of the arm is shown by dotted lines. After the passage of the line, the arm returns automatically to its first position, against the stop pin $k^{17}$.

For the purpose of sounding an alarm when the composed line is nearly completed, I provide a bell, $k^{14}$, mounted on the frame, subject to the action of a gravitating striker, $k^{15}$, made of angular form, and pivoted to the frame with one end in position to be acted upon by an adjustable block, $k^{16}$, on the slide $k^1$.

Passing now to the mechanism for confining the matrix line at the casting point, attention is directed more particularly to Figs. 26, 27 and 28.

The matrix line is pushed forward and upward along the guides to the casting position, between a seat on the frame and the mold G, which latter is seated for the time being between the line of matrices and the mouth of the pot H, from which it receives the molten metal.

The matrices in the line stand, of course, in an inclined position, and at right angles to the inclined guide wires. The line, as it is advanced by the finger F, is arrested and confined at the front by the shoulder $g$, projecting from the face of the mold as shown in Fig. 28, this feature being the same as in the earlier machines.

The rear end of the line is confined as shown in Fig. 27, by the carrying finger F, which is in turn confined and held by the swinging jaw L, very similar to that used in my prior machines. This jaw is mounted to swing on an upright pivot, $l$, so that it may be turned out of the path of the advancing matrices and finger, as shown in Fig. 26, and finally closed behind the finger as in Fig. 27.

The jaw is actuated by a horizontal slide, $l^2$, mounted on a guide rod, and urged constantly forward by a spiral spring, $l^3$. The slide $l^2$ is connected with the swinging jaw or abutment by a slotted link, $l^4$, and the slide is connected by a link to a lever, $l^5$, which is pivoted on the main frame, and acted upon by a cam, $l^6$, on the main shaft.

When the cam operates the lever, the slide $l^2$ is advanced by the lever, and the jaw L thereby opened. When, however, the line is in the casting position, the cam $l^6$ allows the spring $l^3$ to move the slide $l^2$ backward, and the face of the slide, acting against the rear end of the jaw L, causes the latter to swing to its closed position and holds it firmly in place, as shown in Fig. 27.

It is important that the operative end of the jaw shall be firmly supported in the exact position required, so that the end of the matrix line will register with the end of the mold slot. In order that this adjustment may be effected and maintained, I provide the rear end of the jaw, as shown in Fig. 26ª, with an adjustable bearing plate, $l^7$, secured by screws $l^8$, or other suitable means, so that it may be slightly adjusted to and from the slide $l^2$.

Taking up now another of my improvements—means for preventing the casting action in the event of the matrix line being too short—I show, in Figs. 35, 36, 37, this device in its preferred form.

As is well known to those skilled in the art, it is necessary, in order to cast slugs properly and perfectly from the lines of assembled matrices and spacers, that the matrices and spacers shall be held closely and firmly against each other and against the face of the mold. I have just described the manner in which the line is carried around upon the guides by the finger F, until it is properly seated in front of the mold. While it is held in this position and before the casting operation has begun, the line is justified or elongated to a predetermined length by means of the expansible spacers contained in the line. Should the line as composed and justified be shorter than the predetermined space between the line confining abutments— that is—should the expansible spacers fail to expand the line to a sufficient extent— the matrices will not be held closely together, and then the molten metal injected into the mold from the pot during the casting action is liable to flow between and around the matrices in the line, producing an imperfect slug, and rendering the machine inoperative until the matrices shall have been released and cleaned from the metal which has solidified about them, and about the adjacent parts of the machine.

The object of my invention is to prevent this occurrence, by means of a stop finger T, pivoted on the top of the metal pot H, and arranged to swing beneath a block, $t$, on the pot plunger arm $t^1$, and arrest its descent. The finger T is secured to one end of the rod $t^2$, carried, as shown in Fig. 36, across the top of the pot H, and to its other end is secured a crank $t^3$, coöperating by means of the pin $t^4$ with the upper slotted end of the bell crank $t^5$. Normally, the bell crank $t^5$ is spring-held against the stop pin $t^{11}$ by means of the spring $t^7$, and the position of the finger T, under these conditions, is shown by the full lines in Fig. 35,—the arm $t^1$ carrying the plunger being free to fall and force the molten metal into the mold. The justification of the line—that is, the forcing upward in the line of the lower wedge of the expansible spacers—is accomplished by the upper end of the justification slide, $t^{10}$. As shown in the perspective view, Fig. 37, the movements of this slide in its guide ways are governed by a cam, $t^{12}$, and spring-held lever, $t^{13}$, through a system of links.

Whenever the amount of justification is excessive; that is, when the line is composed too short, and the resistance of the matrices to the upward passage of the lower wedge of the expansible spacer becomes negligible, or nearly so, the justification slide $t^{10}$ is driven upward to the fullest extent of its travel, and the projection $t^9$ is carried against the lower end of the screw $t^8$ in the bell crank $t^5$, thereby actuating the finger T and carrying it beneath the block $t$, as shown by the dotted lines in Fig. 35. The effect of this is to lock the pot plunger arm $t^1$ in its upper position, and prevent the normal casting action of the pot into the mold. As soon as the slide $t^{10}$ has been withdrawn, the spring $t^7$ carries the bell crank $t^5$ and all the coöperating parts, including the finger T, back to their normal position.

The essence of my improvement lies in such a form and construction of parts as to lock the pot casting action whenever the lower wedges of the expanding spacers are lifted upward beyond a predetermined point.

After the casting action, the matrix line is carried forward by the finger F, as heretofore, to the rear end of the machine, around a curve in the guides, to the point at which the guides diverge in descending lines, so that the individual matrices will leave the line and return to the groups from which they were released.

While the matrices are being carried around the upper turn, it is important that they should be held in compact form, and prevented from twisting or swaying out of position, so that a smooth and easy movement to the distributing point may be effected. For this purpose I propose to employ at the upper end of the machine a yielding resistant of any suitable character to act in front of the line. This is shown in its preferred form in Figs. 24 and 25, in which M represents an endless chain, mounted in suitable guides, and following for a portion of its length the course of the guide-wires $b$.

At two or more points in its length this chain is provided with the projecting fingers or resistants $m$, one or the other of which projects always into the path of the matrices between the guides $b$. As the matrix line is advanced rearward, its front end encounters one of the resistants $m$, which is pushed forward by and before the line, until the forward end of the line reaches the point at which the guides diverge, as shown in Fig. 25. The resistant, under the pressure of the matrices, is gradually crowded back out of their path, following the course of the chain, leaving the front end of the line free, so that the matrices may descend the guides by gravity. As the one resistant is thus carried forward, the chain is, of course, moved, and the other resistant is brought into position to act in front of the next line of matrices. The chain carrying the resistant is subjected to a moderate degree of friction. This may be secured in any suitable manner; for example by means of a pressure plate, $m^2$, seated upon the chain and acted upon by a spring, $m^3$, attached to the frame.

The essence of this invention lies in the provision of means for offering a moderate resistance to the line as it is carried around the bend in the guides; and it is to be understood that such means may be constructed in any form or manner, provided only that it offers a suitable resistance, and recedes from the path of the matrices, in order that they may be freely distributed.

Referring now to the mold and its operating mechanism, it is to be noted that they are of the same general construction and arrangement as in my earlier patents above referred to.

Referring to Figs. 2, 28, 29 and 38, the mold G, of the usual slotted form, is attached to the outer end of the vertically swinging arm $g^1$, secured to a rock shaft $g^2$, seated in the main frame. The arm receives the swinging motion through an adjustable link $g^3$, from a vertically swinging lever $g^4$, mounted in the main frame, and acted upon by a lifting spring $g^5$ and a depressing cam $g^6$. These connections serve to swing the mold upward to the casting point, with its slot in an inclined position, where it is permitted to remain until the close of the casting operation, after which the arm is swung downward to present the mold in a vertical position in front of the ejector blade, N, by which the slug is delivered as heretofore.

It is necessary that the mold shall be moved face-wise tightly against the matrix line prior to the casting action, and that it shall be retracted after the casting action, in order to withdraw the type characters from the matrices. For this purpose the shaft $g^2$, carrying the mold arm, is mounted to slide endwise, and is moved by the connections shown in Figs. 28, 30, 31, 31ª from the metal pot H. This pot, as in my earlier machines, is arranged to swing on the horizontal supporting shaft $h$, and is provided with an arm, $h^1$, acted upon by a cam, $h^2$, on the main shaft, which, by depressing the arm, causes the upper end of the pot to swing toward and against the mold. To the pot arm $h^1$ I connect a forked lever, $h^9$, on a horizontal rock shaft, $h^4$. On the same axis I mount an arm, $h^5$, the upper end of which is forked to straddle the mold shaft, $g^2$, and engage collars thereon. The shaft $h^4$ passes through a bearing, $h^{12}$, supported upon the main shaft, $h$; and the lower part of $h^{12}$ is so formed and provided with adjusting screws, $h^{13}$, as to partly inclose and bear against a portion of the main frame, A, which is suitably formed to receive it. By means of these screws the position of the pivotal shaft $h^4$ may be adjusted. The arm $h^9$ is connected at one end to the pot arm $h^1$ by a bolt, $h^6$, and a pressure spring, $h^7$, and is secured to the shaft $h^4$. At the opposite end of the shaft $h^4$, and secured to it, is the lever $h^3$, forked and provided with set screws, $h^8$, which bear against opposite sides of an ear or lug, $h^{14}$, on the side of the arm $h^5$. Under normal conditions, the parts $h^9$, $h^3$, and $h^5$ retain their relations to the pot arm $h^1$, so that when the latter is moved to swing the pot forward, the arm $h^5$ will slide the mold shaft $g^2$ forward and carry the mold face-wise against the matrices, the pot continuing its movement until its mouth is seated tightly against the back of the mold. The spring $h^7$ permits the arm $h^5$ to yield in relation to the mold arm, so that the mold is carried against the matrices with a yielding pressure, and permitted to stop in its advance if it meets any excessive resistance, the spring $h^7$ yielding at such time and permitting the arm $h^1$ to continue its movement. The set screws $h^8$ are for the purpose of adjusting the arm $h^5$ in relation to its operating arm, in order to control the forward and backward movement of the mold as required.

For the purpose of insuring a final forward pressure against the mold, I may provide one of the pot legs, as shown in Fig. 31, with a lateral ear carrying a screw, $h^{11}$, to bear against the rear end of the mold shaft $g^2$.

The pot operating lever $h^1$ is mounted to turn on the pot supporting shaft $h$, and acts upon the pot through an intermediate screw, $h^{10}$, seated in an arm on the lower end of the pot, as clearly shown.

In the operation of the machine there is a tendency of the molten metal, dross, etc., to accumulate on the perforated mouth of the pot. I therefore provide a wiper, arranged to traverse the mouth and to remove all foreign matters therefrom. This is clearly shown in Figs. 28 and 29, in which the wiper, O, is attached to the end of a vertically swinging arm, $o$, pivoted to the metal pot at $o^1$, and connected by a link, $o^2$, to a projection on the heel of the mold carrying arm $g^1$, the arrangement being such that the wiper is carried across the pot at the mouth, in advance of the ascending mold, and again carried across the mouth in the reverse direction as the mold descends from the casting to the ejecting position. The pot wiper O may be made of asbestos, wire gauze, or any other material adapted to withstand a high degree of heat.

Figure 40:
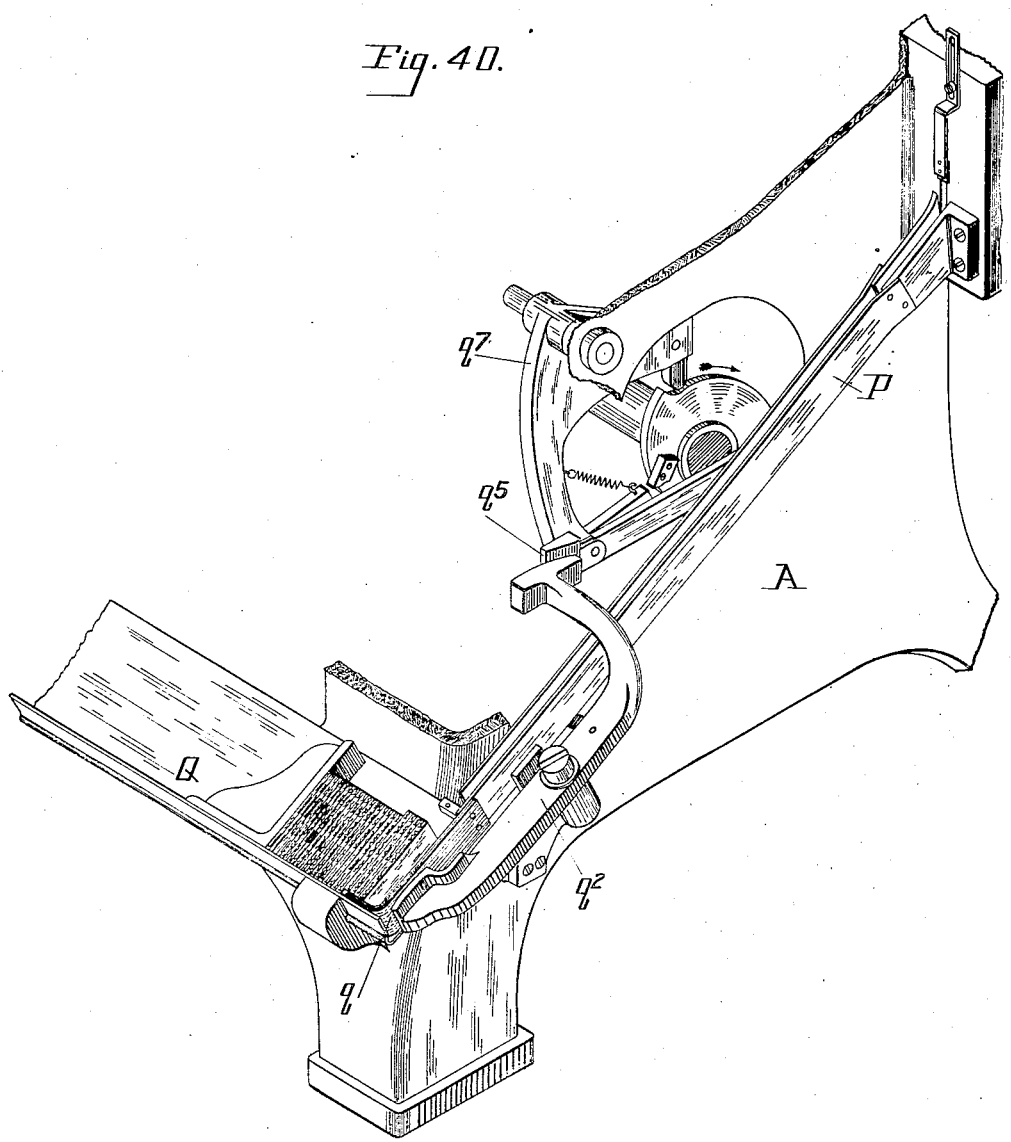

The parts for effecting the delivery of the slug from the mold, and for trimming and assembling the slugs, are arranged as shown in Figs. 38, 39 and 40. When the mold G is turned down to the vertical or ejecting position, it stands directly in front of the ejector N, which is detachably connected to the operating slide $n$, and connected by links $n^1$ to the arms of the ejector lever $n^2$, pivoted on the frame of the machine. When the mold is in the ejecting position, it bears against two adjustable supporting screws, $a$, seated in the frame. These screws support the mold against the thrust of the ejector blade as the slug is being delivered thereby.

The slug, as it is delivered from the mold, must be trimmed on its opposite side faces, and for this purpose I provide, as shown in Fig. 38, the two opposing knives S and $S^1$, secured to the frame so that the slug is delivered between them.

For the purpose of receiving and assembling the slugs, I provide behind the knives an inclined chute or conductor, P, with its upper end in position to receive the slugs and guide them downward to the galley Q, mounted in an inclined position near the base of the main frame and to the left of the keyboard, its position being such that the slugs, with their faces uppermost, are in plain view and within convenient reach of the operator, seated at the keyboard.

The slugs leave the mold in an upright position, and the upper end of the receiving guide is so formed that the slugs enter the same first at their lower end. This causes the slugs to turn or fall over in such manner as to slide downward on their bases. The slugs descend the guide or raceway with considerable speed, and it is necessary that they shall be arrested without mutilating their ends. For this purpose a strap, $q$, of leather or similar pliable material, is extended downward at the end of the galley and carried horizontally into its receiving end, so that the downcoming slugs will abut against it.

For the purpose of moving the successive slugs laterally against the line or column, and pushing the whole series forward step by step along the galley, I provide a lever, $q^2$, pivoted to the frame at $q^3$, and vibrated by means of a spring, $q^4$, and an opposing cam, $q^5$. After each slug descends into the galley, it is pushed sidewise in order to afford room for the entrance of the next slug. The lever $q^2$ is actuated by a cam surface, $q^5$, attached to the ejector operating lever $q^7$. A slug, $q^1$, is shown in Fig. 39 awaiting the packing action of the lever $q^2$; the abutment $q^6$ serves to hold the slugs together as they rest in the galley Q.

As made heretofore, the guide for the ejector blade N was formed of a spring-held rectangular strip of leather, which required frequent renewals. In Fig. 38ª I show my improved form of guide, consisting of a roll seated in bearing pivots in the support $n^3$,—the attaching shoulder screws $n^7$ allowing the support and roll to be spring-held constantly against the ejector blade N. The advantages of this form of guide lie in the durability of the contacting metal roll as contrasted with the strip of leather, in the absence of friction, and ease of operation of the parts affected.

In the operation of the machine it is sometimes desirable to move the composed line of matrices to one position or another by hand. I therefore provide means by which the driving mechanism may be thrown out of action, so that the carrier finger F may be moved at will. This mechanism is shown in Figs. 32, 33 and 34, in which R represents the main driving shaft, connecting, through the sliding clutch $r$, with the loose gear $r^1$, which communicates motion through the idler, $r^2$, to pinion $r^3$ on lower end of shaft $r^4$, which carries the sprocket wheel $r^5$, through which the finger carrying chain F receives motion as heretofore. The clutch $r$ is held normally in action by the spring $r^6$. In order that it may be thrown out of action, the clutch is connected with the controlling lever $r^7$, which receives motion automatically from a cam, as usual. I connect the lever by a link, $r^8$, with a foot lever, $r^9$, so located that the operator may at will operate it and disconnect the clutch, thus leaving the chain and finger free to be moved by hand, so as to transfer the line to any desired point. Below the lever $r^9$ I pivot a latch, $r^{10}$, adapted also to be actuated by the operator's foot, and acted upon by a spring, $r^{11}$, so that it serves to automatically lock the foot lever in position to hold the clutch out of action. If, for any purpose, he desires to disconnect the chain from its driving devices, the operator needs only to depress the lever $r^9$. When he desires to connect the chain, so that it may resume its regular movements, he has only to depress the lever $r^{10}$.

It will, of course, be understood that the chain and finger are driven intermittingly by the usual automatic devices, except as their action is modified by the operator.

Having thus described my invention, what I claim is:

1. In a line-casting machine, the combination of the pendent traveling matrices, the stationary converging guides $b$ by which they are assembled, and the underlying guides J, mounted on rocking supports that they may be swung backward from their active position at the will of the operator.

2. In a line-casting machine, the pendent matrices and the inclined guides $b$, having converging and parallel portions, in combination with an adjustable guide or deflector J to direct the matrices between the parallel portions of the guides, said deflector being pivotally mounted, that it may be swung away from the operative position to expose the assembled matrices at will.

3. In a machine of the class described, having matrix guides $b$ extending in converging and in parallel lines, a rotary packer or pusher I, arranged to act on the successive descending matrices and carry them between the parallel portions of the guides.

4. In a machine of the class described, a series of inclined guides extending first in converging and thereafter in parallel lines, matrices mounted on said guides to descend by gravity, a yielding resistant against which the matrices are assembled between the parallel portions of the guides, and a continuously acting pusher arranged to act on the successive matrices and advance them toward the resistant; whereby the successive matrices are positively added to the line, and the line advanced as it elongates.

5. In a machine of the class described, and in combination with guides upon which the matrices travel, and between which they are assembled, a rotary packer or pusher, having a yielding finger, I, substantially as described.

6. In a machine of the class described, and in combination with converging guides whereon the matrices are suspended and between which they are assembled, a rotary yielding pusher to advance the line between the guides in the course of composition, and a driving clutch for the pusher, adapted to be thrown out of action at will.

7. In a machine of the class described, matrix supporting guides extended firstly in converging, and thereafter in parallel lines, in combination with a packer arranged to act repeatedly between the guides and withdraw therefrom, whereby the matrices are permitted to pass the packer, and are consequently advanced thereby.

8. In a matrix composing mechanism, guides between which the matrices are advanced, in combination with a mechanically actuated packer located at an intermediate point in the length of the guides, and arranged to enter between them from the outside at frequent intervals, whereby the matrices are permitted to pass the packer without interference prior to its action upon them.

9. In a machine of the class described, inclined guides upon which matrices are suspended, and between which they are assembled, in combination with a rotary pusher to advance the matrices between the said guides; and converging guides J, to control the lower ends of the advancing matrices, said guides J mounted to swing backward from their operative position, and means through which the guides control the operation of the pusher.

10. In a machine of the class described, a rotary pusher or packer, I, movable guides J, and packer driving devices controlled by the movement of said guides.

11. In a machine of the class described, parallel guides between which the matrices are assembled, in combination with an external spindle, and a spring supported finger, I, pivoted eccentrically on said spindle, whereby the finger is adapted to enter between the guides and act upon the matrices, and also adapted to yield in the event of excessive resistance.

12. In a machine of the class described, curved parallel guides between which the matrices are assembled, and means for advancing the assembled line between the guides, in combination with a spring supported resistant, K, arranged to reciprocate in a right line, whereby the advancing line is carried clear of the resistant.

13. In combination with parallel curved guides between which the assembled matrices are supported, means for advancing the line of matrices, a finger, a spring actuated resisting slide, $k^1$, a dog to lock the slide as it is advanced by the line, and automatic means for releasing the dog after the passage of the line.

14. In combination, the line advancing finger F and its actuating chain, the line resisting slide $k^1$ and its returning spring $k^2$, the locking dog $k^3$, and the rock shaft $k^7$ and its arms, whereby the dog is disengaged and the slide $k^1$ released when the matrix line is advanced.

15. In a machine of the class described, having parallel wires between which the matrix line is assembled, a keyboard extended in the same direction as the wires, to the end that the operator may view the side of the line in course of composition, and means controlled by the keyboard for delivering the individual matrices to the line.

16. In a machine of the class described, matrix sustaining guides extended downward first in converging lines to assemble the matrices, and thence in parallel lines to confine the assembled matrices, in combination with escapements to control the release of the individual matrices that they may descend to the line, a keyboard arranged in front of the position occupied by the composed line and parallel therewith, and devices extending from said keyboard for operating the escapements, whereby the operator is enabled to view the composed line and the individual matrices in their approach to the line, and also enabled to reach the line to adjust the matrices when required.

17. In combination with escapements to control the release of the individual matrices, a keyboard arranged in front of the position occupied by the composed line and parallel therewith, and devices extended from the keyboard for operating the escapements, whereby the operator is enabled to view the composed line and the individual matrices in their approach to the line.

18. In a machine having converging matrix guides, and escapements to control the release of the matrices, and in combination therewith, vertical slides $d^7$, slide actuating devices controlled by fingerkeys, levers $d^6$, actuated by the slides, and wires extending from said levers to the respective escapements.

19. In a machine of the class described, a series of converging guides arranged to assemble and retain the matrices in line, a finger-key mechanism facing the position occupied by the composed line, a series of escapements to release the matrices, their actuating wires converging toward the keyboard, and levers $d^6$ connecting the wires with the finger-key mechanism, whereby the operator facing the composed line is enabled to control the escapements.

20. In a machine of the class described, a series of converging escapement actuating wires, $d^5$, two rows of levers, $d^6$, connected to the respective wires, the slides, $d^7$, continuously driven devices through which said rows actuate the slides, and fingerkeys controlling said actuating devices.

21. In a machine of the class described, the swinging jaw, L, to confine the matrix line in the casting position, said jaw provided with an adjustable plate, $l^1$, at one end, in combination with an actuating slide, $l^2$, whereby the jaw may be opened and closed and its operative position accurately determined.

22. In combination, the movable melting pot, the pivoted wiper attached thereto, and arranged to traverse the mouth of the pot, the swinging mold arm, and connections through which said arm actuates the wiper.

23. In combination with a swinging metal pot, a mold arranged to vibrate across the mouth of the pot, a wiper arranged to swing across the mouth of the pot, and mechanism for positively moving the wiper in one direction before the advance of the mold and in the opposite direction after the return of the mold.

24. In combination with the swinging metal pot, the pivoted wiper mounted on the pot and arranged to swing transversely across the pot mouth.

25. In combination with the mold arm and its shaft, movable endwise, the pot arm $h^1$, the spring $h^7$, and the arm $h^5$, controlled by the spring, for moving the shaft endwise.

26. In combination with the rocking arm, $h^1$, the longitudinally moving shaft $g^2$, the intermediate arm $h^3$, provided with set screws, the shaft moving arm, $h^5$, controlled by said screws, the horizontal forked arm $h^6$, and the spring $h^7$.

27. In a machine of the class described, the escapements, having open slots, in combination with the actuating wires seated therein and springs acting on the escapements: whereby instantaneous disconnection of the wires is permitted without disturbing their working length.

28. In a machine of the class described, having the slotted escapements, and the keyboard fixed in the frame, the actuating wires and their connections, removable independently from the machine; whereby access to the other parts may be speedily secured.

29. The guide wires, consisting of sections united by a screw thread, in combination with supports removably secured to the frame: whereby adjustment of the tension of the wires is permitted.

30. In combination with the guide wires, comprising sections united end to end by a screw thread, a supporting frame, and supports $b^3$, detachably secured at one end to the frame and secured at the opposite end within the guide; whereby the guide may be adjusted in length and held in place.

31. In a machine of the class described, the matrix guiding wires, in combination with supports seated at one end within the wires to prevent their rotation.

32. In a machine of the class described, and in combination with the movable pot, having a pump lever thereon, a pump stop mounted on the pot and arranged to be actuated by a movable member on the main frame.

33. In combination, the pot, the pump lever, the rock shaft provided with a stop finger, T, a lever, $t^5$, a spring, $t^7$, tending to move said lever in one direction, and a movable member, $t^{10}$, to move the lever in the opposite direction.

In testimony whereof I hereunto set my hand this twenty sixth day of February, 1909, in the presence of two attesting witnesses.

JOHN R. ROGERS.

Witnesses:
 DAVID S. KENNEDY,
 LUCY E. SMITH.